United States Patent
Phillips et al.

(10) Patent No.: US 10,263,721 B2
(45) Date of Patent: Apr. 16, 2019

(54) SIMULTANEOUS CALL TRANSMISSION DETECTION

(71) Applicant: Park Air Systems Limited, Peterborough (GB)

(72) Inventors: Desmond Keith Phillips, Impington (GB); Paul Andrew Noble, Peterborough (GB)

(73) Assignee: Park Air Systems Limited, Peterborough (GB)

( * ) Notice: Subject to any disclaimer, the term of this patent is extended or adjusted under 35 U.S.C. 154(b) by 39 days.

(21) Appl. No.: 15/128,974

(22) PCT Filed: Mar. 24, 2015

(86) PCT No.: PCT/GB2015/050878
§ 371 (c)(1),
(2) Date: Sep. 25, 2016

(87) PCT Pub. No.: WO2015/145138
PCT Pub. Date: Oct. 1, 2015

(65) Prior Publication Data
US 2017/0155460 A1    Jun. 1, 2017

(30) Foreign Application Priority Data
Mar. 24, 2014 (GB) .................... 1405259.1

(51) Int. Cl.
H04W 4/00      (2018.01)
H04J 11/00     (2006.01)
(Continued)

(52) U.S. Cl.
CPC .......... H04J 11/0036 (2013.01); H04L 27/06 (2013.01); H04L 27/265 (2013.01)

(58) Field of Classification Search
CPC ....... H04J 11/0036; H04L 27/06; H04L 27/65
See application file for complete search history.

(56) References Cited

U.S. PATENT DOCUMENTS 4,031,462 A      6/1977   Bouvier et al.
7,668,265 B2 *   2/2010   Balakrishnan ......... H04B 1/719
                                                  375/146
(Continued)

FOREIGN PATENT DOCUMENTS

DE    102007037105    11/2008
DE    102011080999     2/2013
(Continued)

OTHER PUBLICATIONS

Subhadeep (Advantages of Blackman Window over Hamming Window method for designing FIR filter, IJSCET, vol. 4, Aug. 8, 2013) (Year: 2013) (Year: 2013).*
(Continued)

*Primary Examiner* — Maharishi V Khirodhar

(57) ABSTRACT

A method of determining the presence of a secondary carrier signal in a time-domain sum-signal including a primary carrier signal is disclosed, the method comprising: transforming the sum-signal into the frequency domain; extracting at least one peak corresponding to a heterodyne tone from the transformed sum-signal; determining the presence of a secondary carrier signal in the sum-signal based on said at least one peak. A corresponding apparatus is also disclosed.

19 Claims, 14 Drawing Sheets

(51) Int. Cl.
H04L 27/06 (2006.01)
H04L 27/26 (2006.01)

(56) References Cited

U.S. PATENT DOCUMENTS

| | | | |
|---|---|---|---|
| 9,429,603 B2* | 8/2016 | Detert | H04L 1/00 |
| 2004/0165680 A1 | 8/2004 | Kroeger | |
| 2007/0268976 A1* | 11/2007 | Brink | H04B 1/7183 375/260 |
| 2010/0067570 A1 | 3/2010 | Lipp | |
| 2014/0253361 A1* | 9/2014 | Rezk | G01S 7/021 342/16 |
| 2015/0032447 A1* | 1/2015 | Gunawan | G10L 25/84 704/233 |
| 2015/0156648 A1* | 6/2015 | Ponnuswamy | H04B 17/30 455/67.13 |
| 2016/0142236 A1† | 5/2016 | Nguyen | |

FOREIGN PATENT DOCUMENTS

| | | |
|---|---|---|
| EP | 0410663 | 1/1991 |
| WO | WO 2013/023857 | 2/2013 |
| WO | WO 2014/206623 | 12/2014 |
| WO | WO 2015/008165 | 1/2015 |
| WO | WO 2015/145138 | 10/2015 |

OTHER PUBLICATIONS

Communication Relating to the Results of the Partial International Search dated Jul. 23, 2015 From the International Searching Authority Re. Application No. PCT/GB2015/050878.
International Search Report and the Written Opinion dated Sep. 28, 2015 From the International Searching Authority Re. Application No. PCT/GB2015/050878.
Patents Act 1977: Search Report Under Section 17(5) dated Sep. 10, 2014 From the Intellectual Property Office of the United Kingdom of Great Britain Re. Application No. GB1405259.1.
Third Party Observation (PCT Administrative Instructions Part 8) Dated Jul. 22, 2016 From the Patent Cooperation Treaty Re. Application No. PCT/GB2015/050878.
Hoelzler et al. "Sinusvorgang als Modulationstraeger", Pulstechnik, Band I: Grundlagen, 2. Auflage, p. 241, 1986.
Kammeyer "Definitionen Analoger Modulationsformen", Nachrichtenuebertragung, 3. Auflage, p. 100-110, 2004.
SKYbrary Wiki "Blocked Transmissions / Undetected Simultaneous Transmissions (USiT)", SKYbrary Wiki, p. 1-5, Mar. 18, 2012.
Werner "Modulationssatz", Nachrichtentechnik: Eine Einfuehrung fuer Alle Studiengaenge, 2. Auflage, p. 75, 2002.
Wikipedia "Complex Number", From Wikipedia, The Free Encyclopedia, p. 1-22, Mar. 20, 2014.
Wikipedia "Komplexe Zahl", aus Wikipedia, der Freien Enzyklopaedie, p. 1-18, Feb. 17, 2014.
Wikipedia "Reflection Symmetry", From Wikipedia, The Free Encyclopedia, p. 1-3, Jan. 14, 2013.
Wikipedia "Sideband", From Wikipedia, The Free Encyclopedia, p. 1-2, Mar. 6, 2014.
World ATM Congress "Rohde & Schwarz to Present Solutions for Virtual Control Centers at Worls ATM Congress 2014 in Madrid", World ATM Congress 2015, Press Release, 2 P., Feb. 11, 2014.
Azzouz et al. "Procedure for Automatic Recognition of Analogue and Digital Modulations", IEE Proceedings-Communications, 143(5): 259-266, Oct. 1996.
EUROCAE "ED-136: Voice Over Internet Protocol (VoIP) Air Traffic Management (ATM) System Operational and Technical Requirements: Detection of Simultaneous Radio Transmissions", European Organisation for Civil Aviation Equipment, EUROCAE, 112 P., Chap.2.5: 32-36, Feb. 2009.
Kadar "An Analysis of Helicopter Rotor Modulation Interference", IEEE Transactions on Aerospace and Electronic Systems, AES-9(3): 434-441, May 1973.
Maxson "From the Top Down: The Physical Layer—AM OFDM", The IBOC Handbook: Understanding HD Radio (TM) Technology, Chap.8: 221-232, 2007. p. 227-228.
Oetting "A Comparison of Modulation Techniques for Digital Radio", IEEE Transactions on Communications, COM-27(12): 1752-1762, Dec. 1979.
Perisa et al. "Employing Simple FFT-Interpolation for Improved Complex Tone Detection and Fine Estimation", Proceedings of the 3rd International Symposium on Wireless Communication Systems 2006, ISWCS '06, Valencia, Spain, Sep. 6-8, 2006, 5 P., Sep. 6, 2006.
Author: R. Martin Title: Spectral subtraction based on minimum statistics pp. 4 Publication date: Sep. 1994 Publisher and place of publication: Proceedings of EUSIPCO-94/ European Association for Signal Processing/ ESPL CH-1015 P.O. Box 134, CH 1000, Lausanne, Switzerland.†
Author: R. Martin Title: Noise Power Spectral Density Estimation Based on Optimal Smoothing and Minimum Statistics Pages beging submitted: 9 Publication date: Jul. 2001 Publisher and place of publication: IEEE Transactions on Speech and Audio Processing, vol. 9, No. 5, / IEEE / 445 Hoes Ln, Piscataway Township, NJ 08854, USA.†
Author: A. H. Nuttal Title: Some Windows with Very Good Sidelobe Behavior Pages being submitted: 8 Publication date: Feb. 1981 Publisher and place of publication: IEEE Transactions on Acoustics, Speech, and Signal Processing, vol. ASSP-29, No. 1, / IEEE / 445 Hoes Ln, Piscataway Township, NJ 08854, USA.†
Author: F. J. Harris Title: On the Use of Windows for Harmonic Analysis with the Discrete Fourier Transform Pages being submitted: 33 Publication date: Jan. 1978 Publisher and place of publication: IEEE Proceedings, vol. 66, No. 1,/ IEEE /445 Hoes Ln, Piscataway Township, NJ 08854, USA.†
Author: R. E. Crochiere Title: A weighted overlap-add method of short-time fourier analysis/synthesis Pages beging submitted: 4 Publication date: Feb. 1, 1980 Publisher and place of publication: IEEE Transactions on Acoustics, Speech, and Signal Processing, vol. ASSP-28, / IEEE / 445 Hoes Ln, Piscataway Township, NJ 08854, USA.†
Author: U. Zölzer Title: DAFX: Digital Audio Effects Pages submitted: 553 Publication date: 2002 Publisher and place of publication: John Wiley & Sons, Ltd Baffins Lane, Chichester, West Sussex, PO 19 IUD, England ISBN: 0-471-49078-4.†
Authors: J. Schoukens, R. Pintelon, H. Van Hamme Title: The interpolated fast Fourier transform: a comparative study Pages being submitted: 7 Publication date: Apr. 1, 1992 Publisher and place of publication: IEEE Transactions on Instrumentation and Measurement, Issue 2, / IEEE / 445 Hoes Ln, Piscataway Township, NJ 08854, USA.†

* cited by examiner
† cited by third party

Freq. Domain resampling filter g(x)

Envelope function for g(x) for f=+/-0.5, buffer=28K, FFT=64K

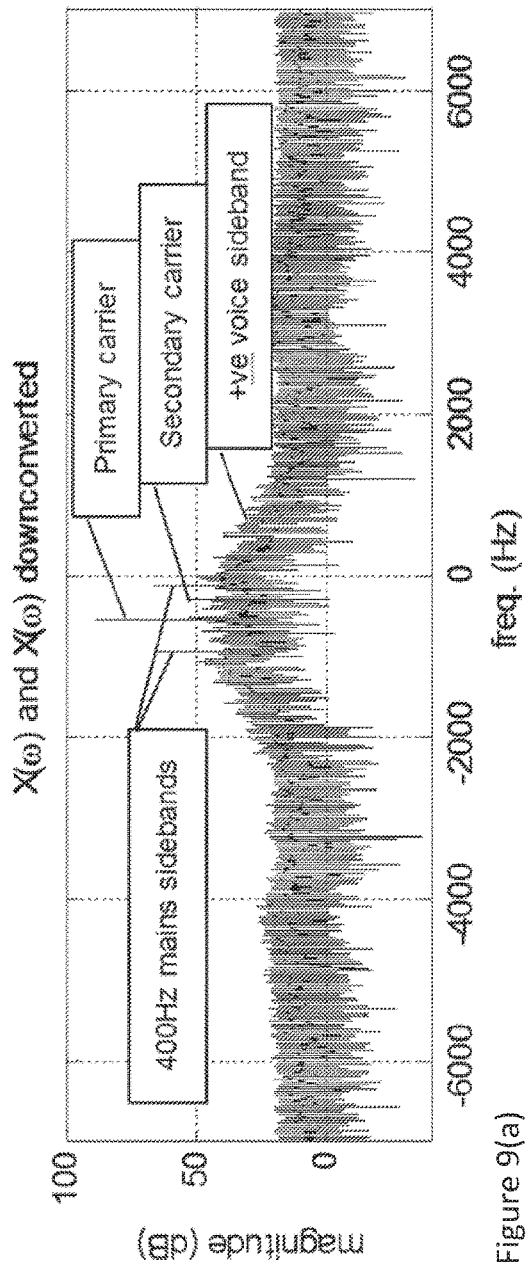
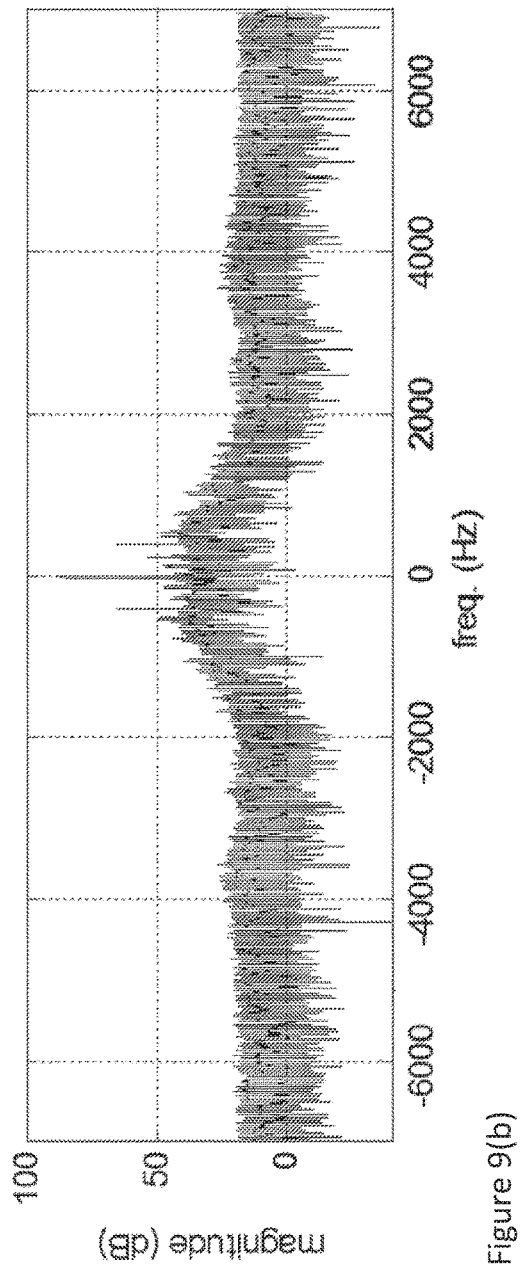
Figure 9(a)
Figure 9(b)

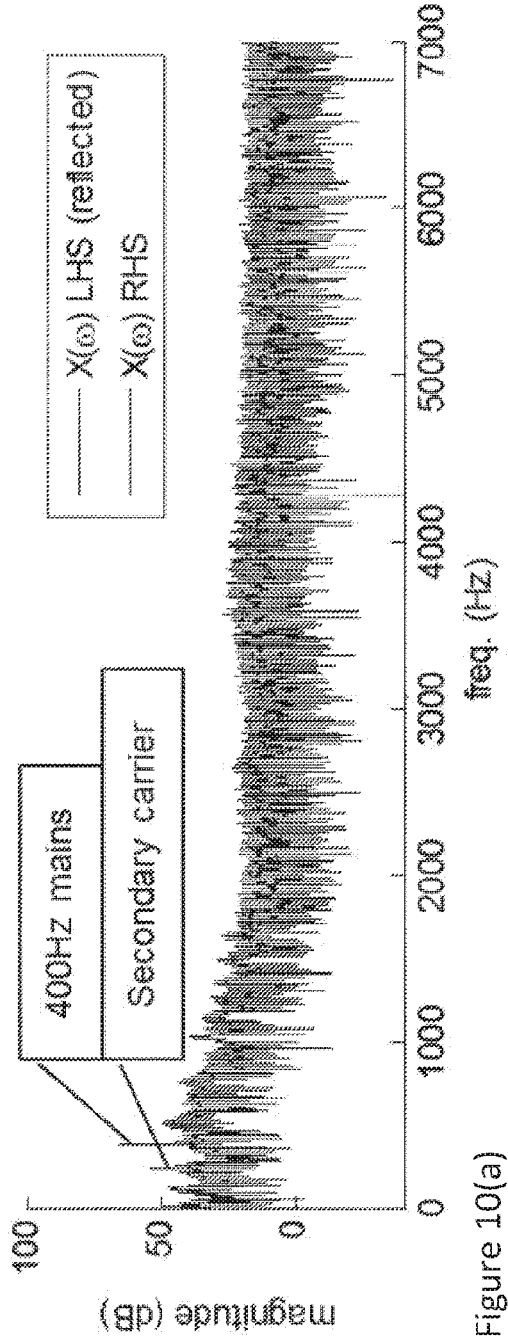
Figure 10(a)
Figure 10(b)

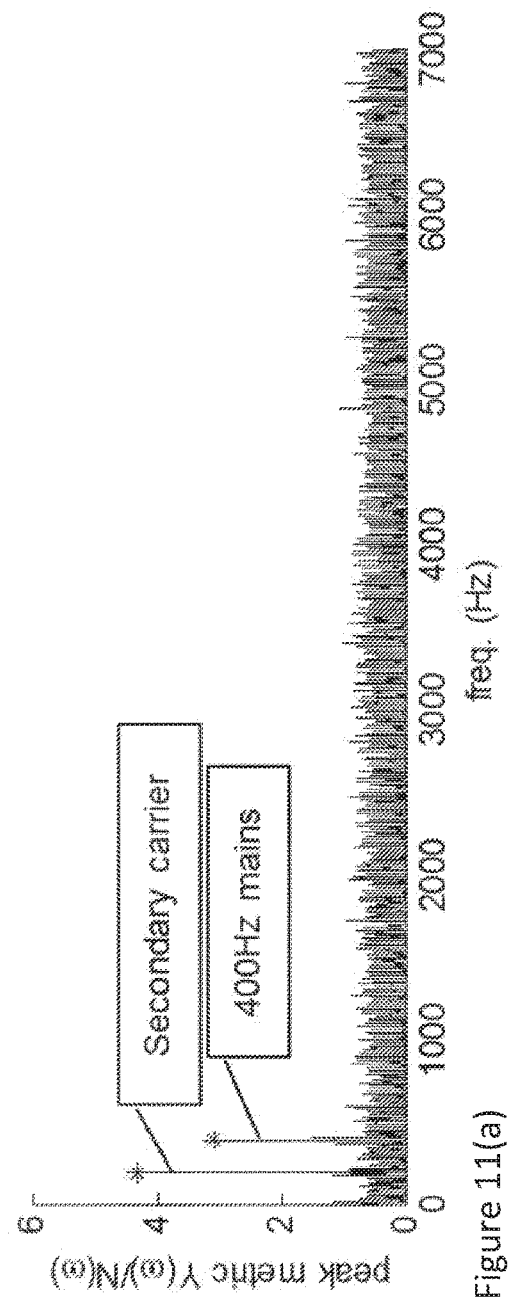
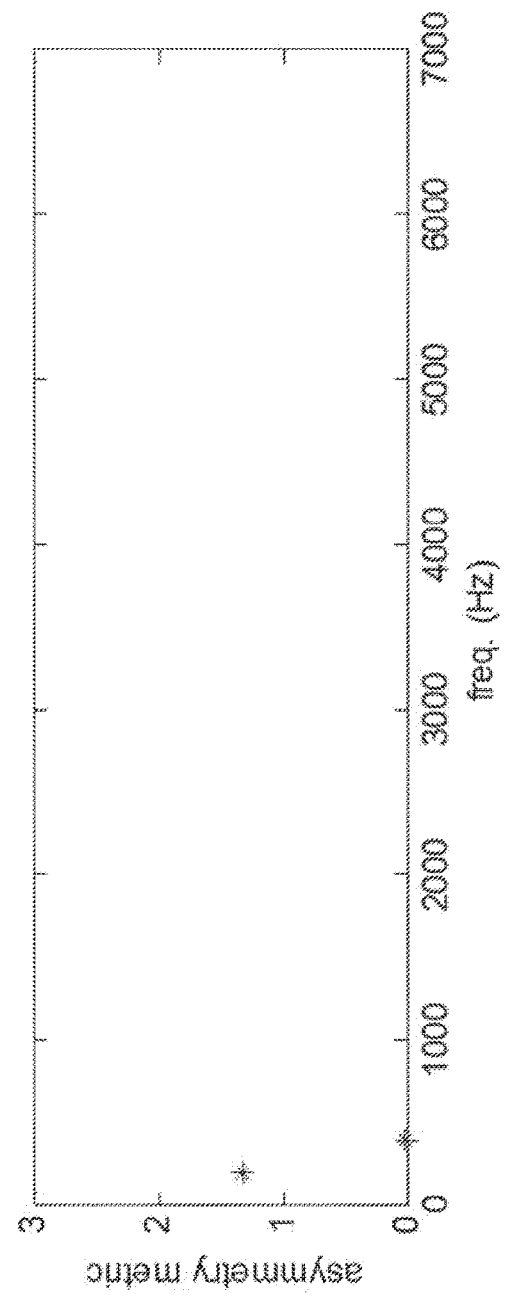
Figure 11(a)
Figure 11(b)

US 10,263,721 B2

SIMULTANEOUS CALL TRANSMISSION DETECTION

RELATED APPLICATIONS

This application is a National Phase of PCT Patent Application No. PCT/GB2015/050878 having International filing date of Mar. 24, 2015, which claims the benefit of priority of United Kingdom Patent Application No 1405259.1 filed on Mar. 24, 2014. The contents of the above applications are all incorporated by reference as if fully set forth herein in their entirety.

FIELD AND BACKGROUND OF THE INVENTION

This invention relates to an apparatus and method for the detection of simultaneous call transmissions, in particular to double-sideband amplitude modulation (DSB-AM) transmissions.

Simultaneous Call Transmissiofn (SCT) is a situation when two or more transmissions occur simultaneously on the same frequency band. The end listener is then (usually) only able to understand the higher powered of the pair of transmissions. An example is illustrated in FIG. 1.

This is a potentially hazardous situation as the sender of the weaker transmission may assume that they were actually heard by the end listener and take action accordingly. A situation where the consequent action would be incredibly dangerous would be where two planes transmit a signal to an air-traffic controller simultaneously, who then replies, and both planes believe the response is directed to them. Such a scenario may be noticed by an alert, trained human operator listening out for the characteristic phenomena of interfering voice and heterodyne tones arising from the frequency difference between the two transmitters. However this only reliably works when the weaker transmitter is (1) within the power range of the stronger transmitter e.g. 0 to −20 dB and (2) the heterodyne lies in the filtered audio range (e.g. 300 Hz to 3.5 kHz). The first condition may not be met if one transmission originates much further away than the other (i.e. one plane is overhead and the other is several kilometres away); the second condition may not be met if the frequency difference between the two transmitters (defined by the precision of the quartz in the transmitting equipment) is minor.

Indeed, SCT can occur far outside of these values due to real world effects such as propagation loss, multipath error and frequency error.

Hence automatic SCT detection is a desirable feature for radios.

SUMMARY OF THE INVENTION

US2010/0067570A1 describes an apparatus adapted to automatically detect when two transmissions occur simultaneously. This system phase demodulates the sum-signal of the dual transmission by converting the baseband In-Phase and Quadrature signal into unwrapped phase and amplitude. A periodic 'wobble' is present on the unwrapped phase if there are close frequency-separated transmissions, as the difference in frequency causes the phasors of the transmissions to rotate around one another. This phase time-series is then Fourier transformed using a bank of transformers with varying window lengths to determine whether any secondary transmission (i.e. a peak due to the unwrapped phase 'wobble') is present. A warning tone is added to the audio output if a secondary transmission is detected so as to alert the operator to the situation.

This proposed solution has several significant drawbacks. The step of producing a phase time series is an intrinsically non-linear process (as it involves performing an arctan) and so errors propagate as the process progresses manifesting as intermodulation products in the output spectrum which are not physically present in the input. Furthermore, in real-world conditions this solution can potentially generate large occurrences of 'false positives' where an alert is sounded when only one transmission is present. This is because this system has no way of suppressing common signal impairments such as sinusoidal mains hum, incidental FM (frequency modulation), frequency-selective multipath effects and $1/f^2$ (reciprocal frequency-squared) phase noise. All of these effects can potentially introduce a certain amount of unwrapped phase 'wobble' and then be identified as secondary transmissions.

False positives are very damaging because they cause an operator to lose faith in the equipment's reliability if it is 'crying wolf' too often. This may result in the operator turning off the automatic SCT feature completely or taking unnecessary mitigating action such as repetition of instructions. Because Air Traffic Control is a safety critical activity, an SCT detection system should be highly tolerant to real signal imperfections so that it is of the highest achievable reliability.

On the other hand, false negatives are inevitable when the secondary transmission is very weak in power, when it becomes indiscernible from the noise floor, and also in the situation where the secondary transmission is superposed on the stronger transmission with negligible frequency difference.

An improved solution is therefore needed.

In one embodiment there is provided a method of determining the presence of a secondary carrier signal in a time-domain sum-signal including a primary carrier signal, the method comprising: transforming the sum-signal into the frequency domain; extracting at least one peak corresponding to a heterodyne tone from the transformed sum-signal; determining the presence of a secondary carrier signal in the sum-signal based on said at least one peak. Such a method provides an efficient way of determining the presence of a secondary carrier signal in a time-domain sum-signal in a manner resistant to false positives; specifically in a linear manner which does not introduce intermodulation products.

Preferably, the method further comprises identifying a primary carrier signal within the sum-signal.

Preferably, the method further comprises determining a conjugate of a sideband of the frequency-domain primary carrier signal and attenuating the primary carrier by using said conjugate of the sideband of the primary signal Preferably, the conjugate of the sideband of the primary signal is subtracted from the opposing frequency sideband of the sum-signal.

Preferably, the step of transformation into the frequency domain is performed using a Fourier Transform (FT).

Preferably, the step of transformation into the frequency domain is performed using a discrete transform comprising input and output bins.

Preferably, the signal is split and mapped onto the input of a transform with a larger size than the signal, wherein a central part of the transform comprises zero-valued input bins are placed.

Preferably, a second half of the signal is mapped onto a first part of the transform input and a first half of the signal is mapped onto a final part of the transform input.

Preferably, identifying a primary carrier signal comprises estimating a primary carrier frequency.

Preferably, estimating the frequency of a primary carrier comprises determining at least one highest magnitude frequency output bin and determining the peak frequency. This is a computationally efficient way of determining the peak frequency.

Preferably, the three highest frequency output bins are determined and a quadratic curve is fitted so as to interpolate the peak frequency. This achieves a more accurate estimation of peak frequency compared to the frequency bin with highest magnitude.

Preferably, the method further comprises down-converting the frequency-domain sum signal based on said estimated frequency.

Preferably, the method further comprises phase-rotating the frequency-domain down-converted sum-signal;

Preferably, the down-conversion is performed by convolving the FT output with a window filter.

Preferably, the window filter comprises a closed-form cosine function.

Preferably, the window filter comprises a Blackman family window, preferably Blackman-Nuttall window.

Preferably, the window filter comprises one of Kaiser or Equiripple.

Preferably, determining the presence of a secondary transmission comprises performing a symmetry analysis on said peak.

In another embodiment there is provided a method of determining the presence of a second carrier signal in a time-domain sum-signal, the method comprising: identifying a primary carrier signal within the sum-signal; attenuating the primary carrier signal from within the sum signal; extracting at least one peak corresponding to a heterodyne tone; performing a symmetry analysis on said at least one peak to determine the presence of a secondary transmission. Such a method provides an efficient way of determining the presence of a secondary carrier signal in a time-domain sum-signal in a manner resistant to false positives; specifically, the symmetry analysis reduces the chance of symmetric noise effects being considered as a secondary carrier signal.

Preferably, identifying a primary carrier signal comprises estimating a primary carrier frequency.

Preferably, identifying a primary carrier signal comprises estimating the phase of the primary carrier.

Preferably, the method comprises transforming the sum-signal into the frequency domain.

Preferably, estimating the frequency of a primary carrier within the sum-signal comprises determining at least one highest magnitude frequency output bin and determining the peak frequency.

Preferably, the phase estimation is performed by determining at least one highest magnitude frequency output bin and determining the phase of the peak frequency component.

Preferably, the three highest frequency output bins are determined and a curve is fitted so as to interpolate the peak frequency.

Preferably, the fitted curve is a quadratic curve.

Preferably, following down-conversion, the quadrature component of the time-domain sampled signal is transformed into the frequency domain prior to peak extraction.

Preferably, the down-converting comprises mixing the sampled signal with a sinusoid with a frequency and phase corresponding to an estimated frequency and phase of the primary carrier.

Preferably, the transformation into the frequency domain is a Fourier Transform (FT), preferably a Fast Fourier Transform (FFT).

Preferably, the symmetry analysis comprises: determining a measure of the ratio of the magnitude of a peak at a certain frequency above a central frequency with the magnitude of the signal at the corresponding frequency below the central frequency. This ratio is an easily calculated measure of the symmetry of a particular feature.

Preferably, the method comprises comparing said asymmetry ratio to a pre-determined threshold.

Preferably, the magnitude of the peak is used in conjunction with said ratio in determining the presence of a secondary transmission.

Preferably, the method comprises producing a confidence score of a secondary carrier transmission being present based on the peak magnitude and asymmetry ratio.

Preferably, the presence of a secondary transmission is determined only if a peak corresponding to the carrier of a primary transmission is present.

Preferably, the presence of a secondary transmission is determined only if the magnitude of said primary carrier peak is above a pre-determined threshold.

Preferably, the presence of a secondary transmission is determined only if the width of said primary carrier peak is below a pre-determined frequency threshold.

Preferably, following peak extraction, if two peaks are within a minimum frequency separation of one another, the peaks are combined into a single peak prior to determination of the presence of a secondary carrier.

Preferably, the minimum frequency separation is between 5 Hz and 50 Hz, preferably between 7 Hz and 15 Hz, preferably approximately 10 Hz.

Preferably, the peak with the lower magnitude is discarded.

Preferably, the sum-signal is decimated so as to reduce the bandwidth.

Preferably, the frequency domain transform output is gain-transformed so as to compensate for decimator ripple.

Preferably, the gain transformation is the reciprocal of the gain due to the magnitude spectrum response of the decimator.

Preferably, the sum-signal is sampled.

Preferably, the sum-signal is sampled in overlapping blocks.

Preferably, the sampling consists of the most recent T seconds of the signal and the sampling rate is M times per second, where $T*M>1$.

Preferably, T is between 1 and 4, and M is between 2 and 8.

Preferably, $T=2$ and $M=4$.

Preferably, the method further comprises: estimating a noise floor of the down-converted signal; subtracting a measure said noise floor from the signal prior to peak extraction.

Preferably, wherein the noise floor estimation comprises performing a moving-average.

Preferably, the moving average comprises summing contiguous blocks of $D_1$ samples and calculating the median across $D_2$ of said blocks.

Preferably, $D_1$ is approximately equal to $D_2$.

Preferably, the method further comprises alerting an operator to the presence of a secondary transmission.

Preferably, alerting an operator comprises inserting a tone into an audio output or a flag into a datastream.

Preferably, alerting an operator comprises indicating the presence of a secondary transmission on a user interface.

Preferably, alerting an operator comprises indicating the confidence level of the presence of a secondary transmission.

In another embodiment there is provided a method of reducing windowing artefacts in a time/frequency transform of a signal,: applying said windowing function to a signal; mapping the signal onto the input of an oversampled transform; wherein a central part of the transform input has zero-valued input bins; performing a time/frequency transform; outputting a frequency spectrum of the signal. Such a method reduces artefacts being brought into the signal which may be incorrectly identified as a secondary carrier signal.

Preferably the transform is a Fourier transform

Preferably, a second half of the signal is mapped onto a first part of the transform input and a first half of the signal is mapped onto a final part of the transform input.

Preferably, the method further comprises the step of determining the presence of a secondary carrier signal from the frequency spectrum of the signal.

Preferably, the method further comprises alerting a user to the presence of a secondary carrier signal.

Preferably, the signal comprises voice communication.

Preferably, the voice communication is transmitted from an aircraft and intended to be received by an air traffic controller.

In another embodiment there is provided an apparatus adapted to carry out a method according to any preceding claim.

In another embodiment there is provided an apparatus for determining the presence of a secondary carrier signal in a time-domain sum-signal including a primary carrier signal, the apparatus comprising: means for transforming the sum-signal into the frequency domain; means for extracting at least one peak corresponding to a heterodyne tone from the transformed sum-signal; means for determining the presence of a secondary carrier signal in the sum-signal based on said at least one peak.

In another embodiment there is provided an apparatus for determining the presence of a second carrier signal in a time-domain sum-signal, the method comprising: means for identifying a primary carrier signal within the sum-signal; means for attenuating the primary carrier signal from within the sum signal; means for extracting at least one peak corresponding to a heterodyne tone; means for performing a symmetry analysis on said at least one peak to determine the presence of a secondary transmission.

In another embodiment there is provided an apparatus for reducing windowing artefacts in a time/frequency transform of a signal: means for applying a windowing function to a signal; means for mapping the signal onto the input of an oversampled transform; wherein a central part of the transform input has zero-valued input bins; means for performing a time/frequency transform; means for outputting a frequency spectrum of the signal.

Preferably, the apparatus comprising a radio.

The invention extends to any novel aspects or features described and/or illustrated herein. Further features of the invention are characterised by the other independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

The invention also provides a computer program and a computer program product comprising software code adapted, when executed on a data processing apparatus, to perform any of the methods described herein, including any or all of their component steps.

The invention also provides a computer program and a computer program product comprising software code which, when executed on a data processing apparatus, comprises any of the apparatus features described herein.

The invention also provides a computer program and a computer program product having an operating system which supports a computer program for carrying out any of the methods described herein and/or for embodying any of the apparatus features described herein.

The invention also provides a computer readable medium having stored thereon the computer program as aforesaid.

The invention also provides a signal carrying the computer program as aforesaid, and a method of transmitting such a signal.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

In this specification the word 'or' can be interpreted in the exclusive or inclusive sense unless stated otherwise.

BRIEF DESCRIPTION OF THE SEVERAL VEIWS OF THE DRAWINGS

The invention extends to methods and/or apparatus substantially as herein described with reference to the accompanying drawings.

Purely by way of example, the present invention is illustrated by the accompanying drawings in which:

FIG. 9($a$) shows an example frequency plot of a secondary signal, superposed on a primary signal carrying voice and 400 Hz mains interference present;

FIG. 9($b$) shows the signal of FIG. 9($a$) following down-conversion;

FIG. 10($a$) shows the left hand side of the signal of FIG. 9($b$) reflected onto the right hand side;

FIG. 10(b) shows the signal of FIG. 10(a) following DSB-AM cancellation and a noise floor estimate;

FIG. 11(a) shows the signal of FIG. 10(b) following noise floor estimation;

FIG. 11(b) shows the asymmetry metric of the peaks detected from the signal of FIG. 10(a);

DESCRIPTION OF SPECIFIC EMBODIMENTS OF THE INVENTION

In this specification, the term 'primary transmission' or 'primary carrier' refers to the transmission with greatest power. The term 'secondary transmission' or 'secondary carrier' refers to any other (lower-powered) transmission occurring at the same time from another aircraft.

Air traffic controller (ATC) to aircraft communication is generally very concise, each transmission is typically less than 10 seconds in duration, and can be as short as 2 or 3 seconds. For this reason, the latency in detecting a secondary call transmission (SCT) is preferably less than 2-3 seconds for this field of use. The term 'simultaneous' in this specification refers to the situation where two transmissions overlap in time, as in this scenario an ATC would either not hear the SCT or the audio would be filtered out by the radio.

Figure 1:
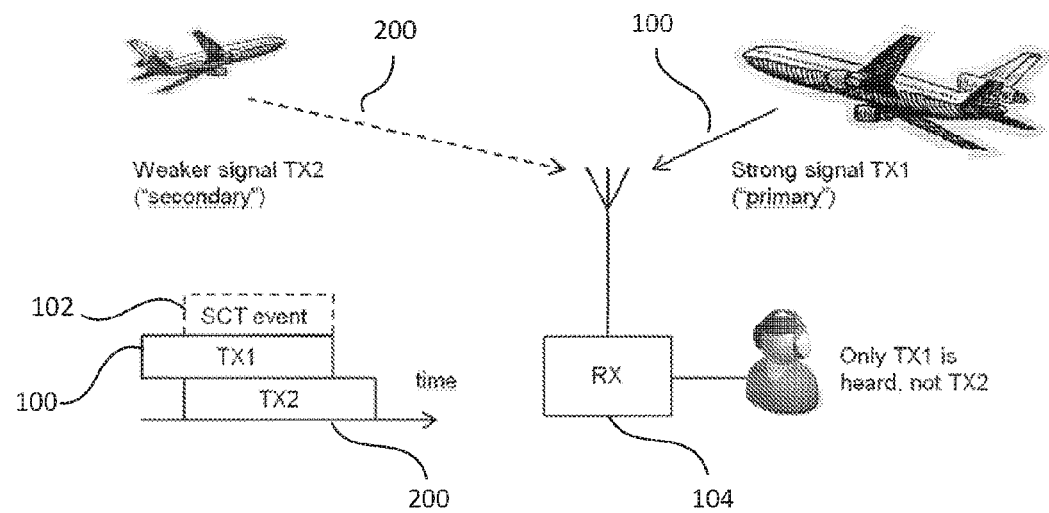
FIG. 1 shows a Simultaneous Call Transmission (SCT) scenario.
Figure 2:
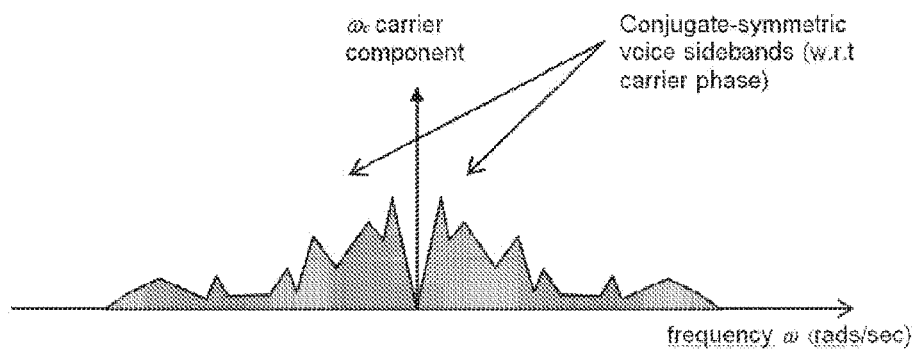
FIG. 2 shows an example Double Side-Band Amplitude Modulated (DSB AM) signal.

A typical speech DSB-AM signal can be fully described by the complex time-domain signal:

$$x(t)=A(1+kv(t))e^{(\omega_c t+\theta)j} \quad \text{Equation 1}$$

where
t is the time in seconds
A is a gain constant (proportional to the transmitter Root Mean Square (RMS) power)
v(t) is the real-valued audio signal, normalised to (−1,+1) peak to peak
k is the modulation depth in the range (0,1) expressed as a percentage.
$\omega_c$ is the carrier frequency in radians/sec, typically approximately $(2\pi)118$ MHz.
θ is some notional phase offset (in radians) with respect to t=0
j is $\sqrt{-1}$ The spectrum (i.e. Fourier transform) of such a signal is shown in FIG. 2—X(ω). The signal is centred on a theoretically infinitesimal carrier frequency $\omega_c$. In reality, this carrier band is broadened by system and transmission imperfections. There are 'conjugate symmetric' sidebands either side of $\omega_c$, such that, for within the bandwidth of v(t), $X(\omega_c+\omega)$ is the same as $X(\omega_c-\omega)$; equal magnitude and conjugate phase.

For convenient manipulation later, we express DSB-AM conjugate symmetry by first computing the conjugate of the carrier phasor as $$c = \frac{X(\omega_c)^*}{|X(\omega_c)|} \quad \text{Equation 2}$$

where * indicates conjugation.

The conjugate symmetry property means that the following equality holds (approximate in practice, due to system imperfections and external effects).

$$(X(\omega_c+\omega)c) \cong (X(\omega_c-\omega)c)^* \quad \text{Equation 3}$$

The imperfections in the system are due to noise, cancellation imperfections and superimposed signals (such as a weak secondary transmitter due to SCT). In order to find these, the following calculation is performed:

$$Y(\omega)=(X(\omega_c+\omega)c)-(X(\omega_c-\omega)c)^* \quad \text{Equation 4}$$

In order to perform such a calculation, properties of the primary carrier signal (i.e. $\omega_c$ and c) must be first known. Once the primary carrier has been identified, it can be isolated and removed, allowing subsequent analysis of Y(ω) to determine whether an SCT has occurred.

Figure 3:
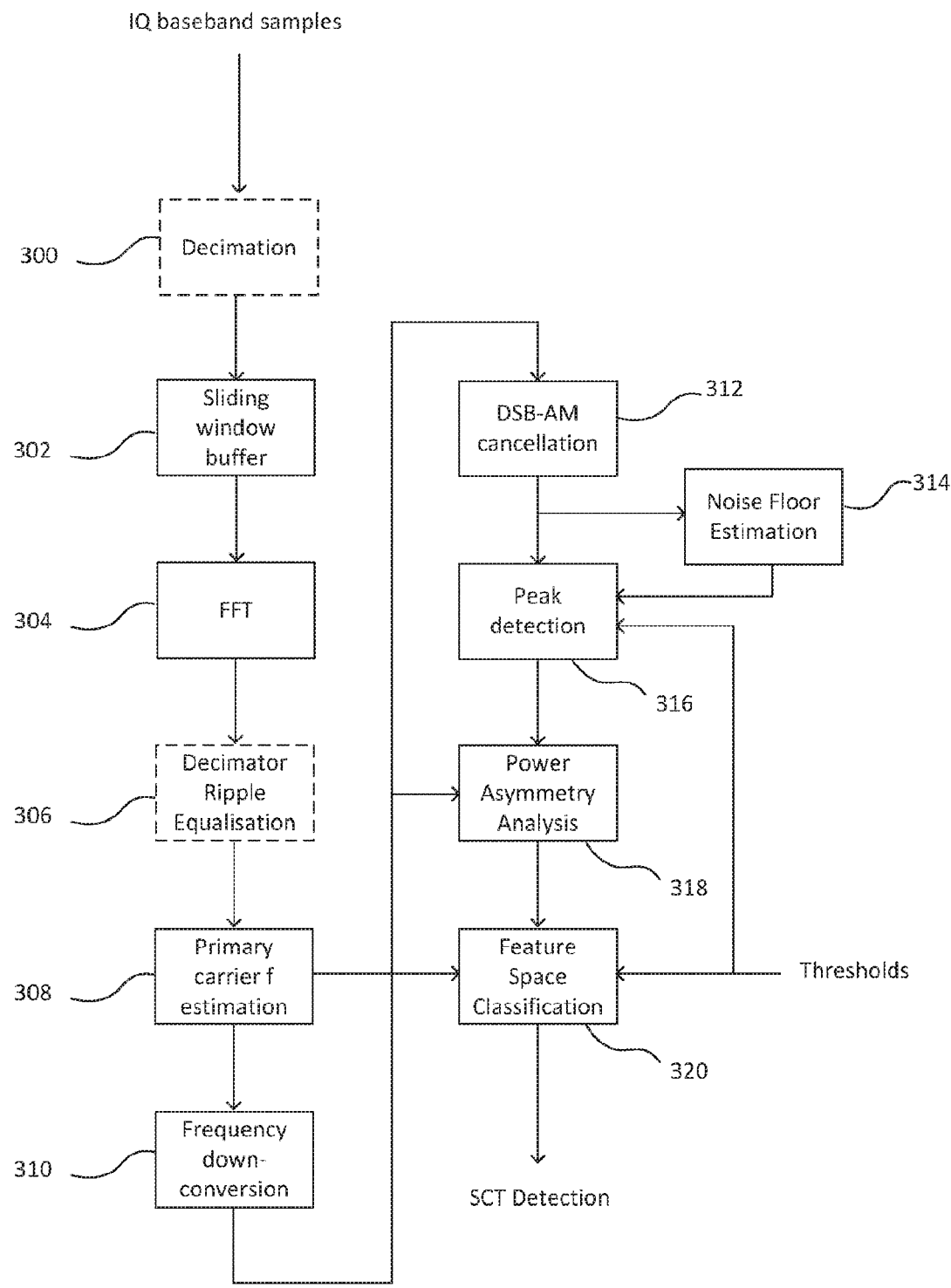
FIG. 3 is an example flow diagram of an SCT detection method.

FIG. 3 illustrates a high-level dataflow of an exemplary method (referred to as 'Frequency Domain (FD) SCT detection') for detecting the presence of a secondary call transmission in an input signal. The input is a high sample rate IQ (in-phase/quadrature) baseband time-series (real or complex) and the outputs are SCT detection results (for example, as a tone inserted into the audio signal or a flag placed into a data stream). Each step is described in more detail below the following brief overview.

As used herein, the term "sum-signal" (and similar) preferably connotes a signal received by a receiver (for example an air traffic control system). Such a sum signal preferably comprises a primary carrier signal, noise, and potentially a secondary carrier signal (where present); the term "sum" merely implies, preferably, that such elements (primary carrier signal, noise, etc) are present in one and the same signal.

A sum signal is received and converted to an IQ baseband sample. This signal is decimated 300 (downsampled) removing unnecessary frequency components so as to reduce the load on later processing steps.

The decimated signal is sampled using an overlapping, sliding window buffer 302 which stores a given length of signal to be processed. Sampling the signal means that the entire signal does not need to be processed in one go, improving the latency of detection and reducing processor load.

The length of the buffer is determined by the trade-off between processor load in analysing lengthy samples and the increased detection accuracy (i.e. high signal-to-noise ratio) longer samples afford. The sampling rate (i.e. number of windows per second) is determined by a trade-off between processor load in processing large numbers of windows within a short time-period and latency of SCT detection.

Each window sample is then input into a Fast Fourier Transform (FFT) 304—outputting X(ω)—for further processing in the frequency domain. An FFT is preferable to a continuous Fourier Transform (FT) as it is much less processor-intensive. Other discrete transforms such as wavelet transforms or spectral line filters may be used.

The decimation step may introduce 'decimator ripple' in the frequency domain output, this is corrected for at step 306 before any further processing.

The frequency of the primary carrier transmission is estimated 308, and the FFT output is down-converted 310 based on this frequency. The in-phase elements to the primary carrier transmission are then cancelled by subtracting the conjugate of the negative sideband frequencies of the primary signal from their counterpart positive sideband frequencies in the (decimated, down-sampled, frequency domain) sum signal 312.

The remaining signal—Y(ω)—is due to phase noise or other signals at different frequencies (which may be SCTs) to the main carrier transmission in the signal. This signal is analysed for peaks 316 (defined by a threshold) above an estimated noise floor 314. These peaks are indicative of an SCT being present as they represent significant magnitude parts of the signal which are not on the same carrier frequency as the primary transmission (e.g. peaks corresponding to a heterodyne tone). However, other effects, such as mains hum and phase noise may show up as peaks above a nominal noise floor. Noise effects such as these affecting the sidebands of the primary carrier are typically symmetric about the primary carrier frequency, thus an asymmetry analysis 318 is performed to determine whether a particular peak has a corresponding 'mirror image' peak. This analysis is performed using an 'asymmetry threshold'. The peak is also analysed for its magnitude (above the noise floor) as higher power peaks are more likely to be secondary transmissions rather than variations in noise. These two parameters (and/or others) are combined in a 'Feature Space Classification' 320 and an SCT can be signalled if a sample contains a peak exceeding the predetermined threshold(s).

This process is performed continuously for every sampled window of the incoming signal. It should be noted that the method has been shown as split into numerous discrete steps whereas in practice many of these steps may occur simultaneously or as part of a single step.

The process described above (after sampling) is undertaken entirely on the spectrum of time windows of signal rather than any time-series. This is significant as the main (distinguishable) physical difference between primary and secondary transmissions is the slight difference in central frequency. Analysing the spectrum is thus addressing the fundamental problem. Furthermore, all of the above processes are mathematically linear, thus greatly reducing the potential of spurious artefacts being introduced, or for errors to propagate and become amplified as the process continues.

Figure 4:
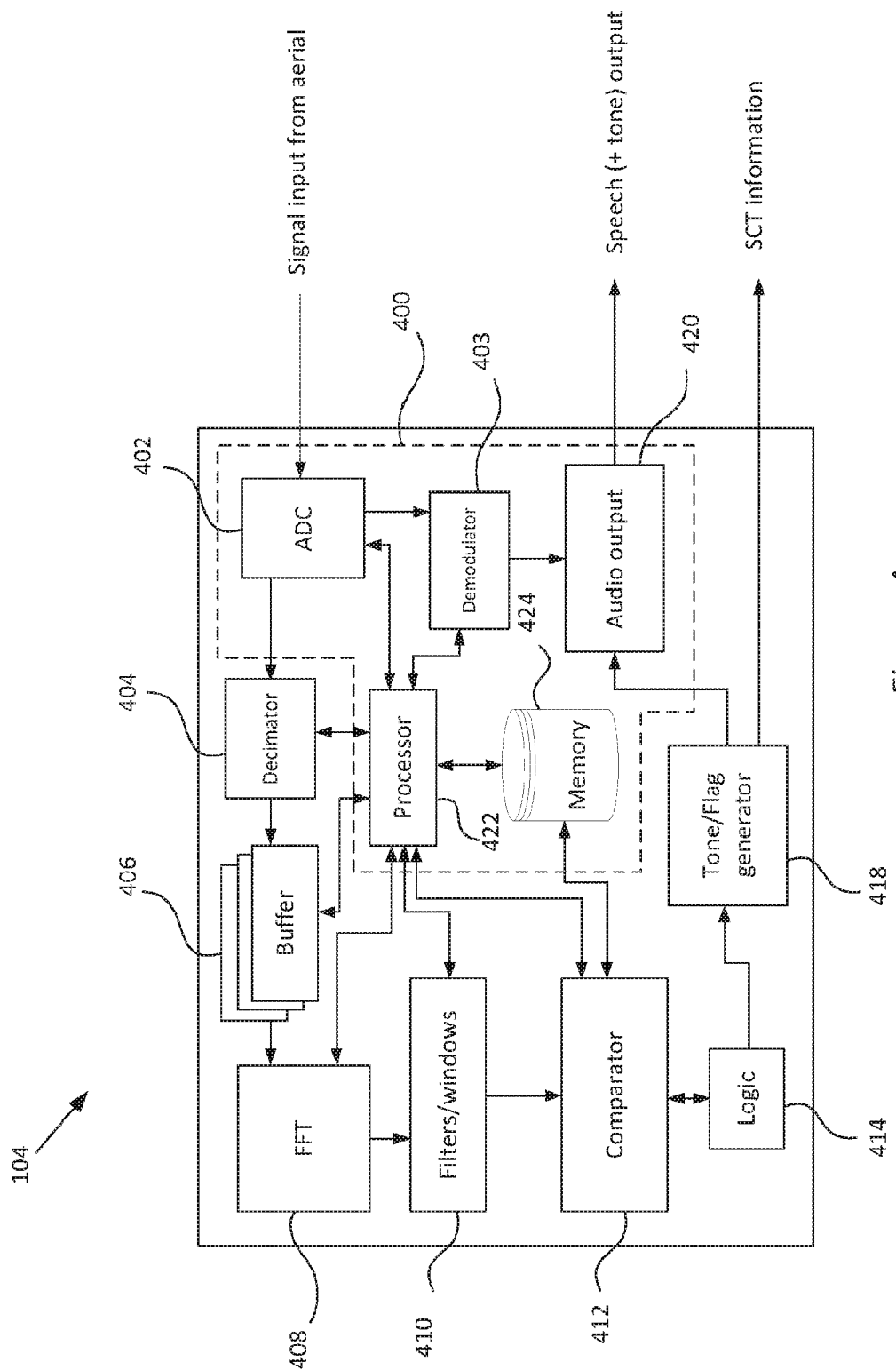
FIG. 4 is a schematic diagram of an apparatus operable to perform the method shown in FIG. 3.

FIG. 4 shows a schematic diagram of a radio receiver 104 adapted to perform the processes involved in the detection of a secondary call transmission as described above.

A signal is received by an aerial and is input to an Analogue-to-Digital Converter (ADC) 402. The dotted section 400 represents a simplified digital radio receiver without any SCT detection capability. The digital signal is demodulated by demodulating unit 403, with assistance from a central processor 422 and memory 424. This is then passed to an audio output unit 420 and audio is outputted. An actual digital radio may include many additional components (such as tuning, filtering and amplifying circuitry), but such components are omitted for clarity in this figure.

This audio extraction process occurs independently of the SCT detection, as this represents the primary purpose of the radio 104, to convert received signals into audio (or other useful information). The components used for SCT detection are shown outside of the dotted section 400.

The digital signal is decimated (downsampled) by decimator 404 before being sampled in a sliding window buffer 406. Each window is then passed through a Fast Fourier Transform (FFT) 408.

The spectrum outputted from the FFT has filters/windows 410 applied to it so as to produce the signal defined by Y(ω) in equation 4. This output is passed to a comparator 412, which, with logic circuitry 412 and thresholds stored in memory 424, determines whether an SCT has occurred. If so, the operator is notified, for example by a tone being inserted into the audio output and/or a flag (such as an indicator on a user interface) is raised via tone/flag generator 418. Other information regarding the SCT, such as indication of a confidence level, or timestamp of the event, may also be outputted.

FIG. 4 shows components separated for clarity whereas in reality many of these components may be combined as a single component (such as the comparator, logic combined with the processor) or further split into separate components.

The following description further details the various steps briefly described above.

Decimation 300

In a DSB-AM radio receiver, the intermediate digital signal after analogue to digital conversion is often at a higher sample rate than is required to support the DSB-AM sidebands of a primary signal.

The decimation stage 300 represents the context-dependent low-pass filtering and down-sampling that may be required to reduce the signal bandwidth to a value of e.g. ±7 kHz at a sample rate of $f_s$=14 kHz. For instance, such a bandwidth will support a primary DSB-AM signal with 4 kHz audio bandwidth (A) and up to ±3 kHz of frequency error (B). The relationship between A, B and $f_s$ are illustrated below, with additional example values:

| Audio bandwidth on Primary DSB signal (kHz) | Maximum Primary Frequency Error (kHz) | Complex Sample Rate after decimation ($f_s$) (kHz) |
|---|---|---|
| A | ±B | $f_s = 2*(A + B)$ |
| 5 | 4 | 18 |
| 3 | 3 | 12 |
| 4 | 3 | 14 |

The purpose of decimation is twofold: (1) to reduce the computational load and (2) reject signals outside the band of interest for SCT detection. The decimation step (and the subsequent ripple equalisation) would not be necessary if these issues are not of any relevance (e.g. if the analogue-to-digital converter has a low sample rate).

The decimator design preferably has a narrow transition region (for example 10% of passband) with low passband ripple (0-3 dB) and high stopband attenuation (for example more than 40 dB) i.e. a typical specification for a high-quality decimator for audio applications. A typical low-pass mask specification given the third set of parameters in the above table would be ±1 dB of passband ripple up to 5 kHz, a transition region from 5 kHz to 7 kHz, and −60 dB of gain in the decimation stopband.

Note that if the time-series is real-only, then a complex oscillator and mixer are required to down-convert the signal before the decimator. The decimation low-pass filter then requires sufficient stopband attenuation to adequately remove the frequency-shifted conjugate image.

Sliding Window Buffer 302

Figure 5:
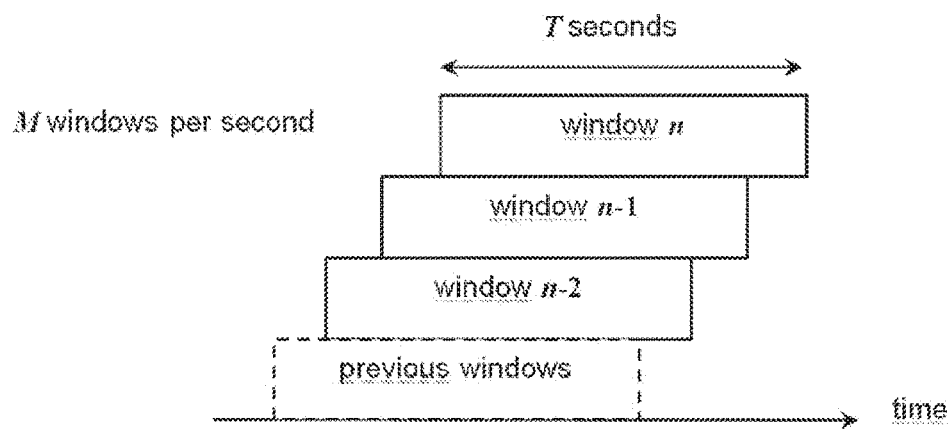
FIG. 5 shows overlapping windows of the sliding window buffer of FIG. 3.

This stage presents the most recent T seconds block of sample data M times a second to the subsequent processing stages as illustrated in FIG. 5. Blocks preferably have a high degree of overlap to maximise the chance of detecting a secondary transmission as soon as it starts. Typical values for this stage (for the ATC example discussed above) are T=2 seconds, M=4 Hz, in this case the longest time possible between an SCT event beginning and the end of one window—$t_{max}$ is 1/M=0.25 seconds. However, not all SCT events may be detected in such a short time period as the signal may be too weak; in such circumstances, due to the overlap of windows, the next window would have 0.5 seconds of SCT to detect and so on. Thus a detectable constant SCT would be detected within $T+t_{max}$ (=T+1/M) seconds. In order to ensure overlap the following identity must hold: T*M>1, but ideally at around 8 windows overlap, so T*M≥8.

The purpose is to allow strong signals to be detected quickly by the system at a coarse granularity in time, but also allow an adequate time-history to allow the coherent integration and detection of weak secondary signals.

In use, M times a second, a buffer comprising the last T seconds of data is processed. This results in each data block of length 1/M seconds being processed T*M times in total. For illustration T can be in the range 1 to 4 seconds and M can be in the range 2 to 16. T governs the coherent integration period for detecting weak SCT signals and it is of advantage to be long and about the same length as typical primary transmission utterances. The value of (1/M) governs the maximum latency for detecting strong SCT signals and it is advantageous for M to be high for low latency. The processing load is proportional to the product T*M, thus there is a trade-off between performance and processor load when selecting values of T and M.

Although in use a large number of window buffers will be processed, for clarity, the following description will solely focus on the processing of a single window.

Oversampled, Zero-Padded FFT 304

Figure 6:
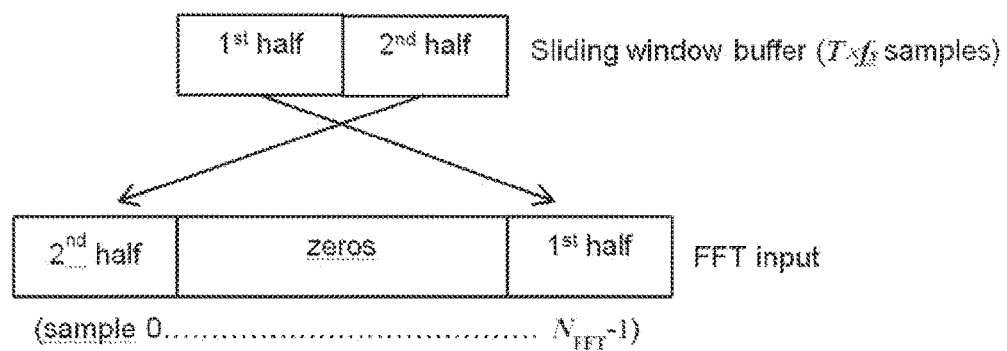
FIG. 6 is an illustration of the 'zero padded FFT' of FIG. 3.

FIG. 6 illustrates how the current analysis window from the buffer is mapped into the FFT input with 'zero padding'. The mapping is unconventional in that the buffer is split into two halves and the first half is mapped into the final part of the FFT input and the second half is mapped into the start of the FFT input, with zero-value inputs occupying the intervening samples. This improves the operation of frequency domain down-conversion as described below.

The FFT size $N_{FFT}$ is chosen to be around twice the size of the buffer window to provide sufficient oversampling for subsequent processing. The choice of oversampling ratio at approximately ×2 is a compromise between two conflicting factors: (1) critical sampling at around ×1 oversampling is not viable because down-conversion requires an unfeasibly long resampling filter for the required DSB-AM cancellation fidelity, (2) the system performance at say, >×3 oversampling yields negligible performance benefit at the expense of increased computational complexity in the FFT. Of course, oversampling ratios of greater than ×3 may be used if computational complexity is not an issue—for example if the fidelity of the cancelation is paramount.

For example with a signal sampling rate, $f_s$, of 14 kHz and T=2 seconds, the buffer is 28,000 samples long. This indicates that an FFT size of $N_{FFT}$=65,536 (the oversampling ratio being 2.34) is appropriate; presuming that a standard Digital Signal Processing (DSP) library function is used requiring a power-of-two size (i.e. $N_{FFT}=2^n$, where n ∈ $\mathbb{Z}^+$, in the example above, n=16). The relationship between these variables and example combinations are indicated in the table below:

| Sample Rate (kHz) | T (seconds) | Buffer Blocksize (kSamples) | Radix-2 FFT Size (kSamples) | Oversampling Ratio |
|---|---|---|---|---|
| $f_s$ | T | C = $f_s$*T | $N_{FFT}$ | $N_{FFT}$/C |
| 10 | 2 | 20 | 64 (≈$2^{16}$) | 3.2 |
| 12 | 4 | 48 | 64 (≈$2^{16}$) | 1.3 |
| 14 | 6 | 84 | 128 (≈$2^{17}$) | 1.5 |
| 16 | 8 | 96 | 128 (≈$2^{17}$) | 1.3 |

Depending on operational requirements/constraints, a larger or smaller oversampling ratio may be used. The larger the oversampling, the more processor-intensive the resulting analysis would be (due to the greater number of discrete frequency 'bins' in the frequency domain) but the system would be more accurate due to (at least) the spectrum having greater resolution.

For later convenience, the FFT output vector is denoted as the vector x with elements $x_i$ where i={0,1 . . . , $N_{FFT}$−1} counting up from the zero frequency bin.

Decimator Ripple Equalisation 306

The low-pass filter discussed above with reference to decimation may have significant passband ripple in order to be implementable with realistic cost. Passband ripple is an artefact manifesting in the spectrum of a transformed signal having had imperfect (i.e. non-square) band-pass filters applied to it.

The gain fluctuation across the band of interest can degrade the ability to perform primary carrier double sideband cancellation as it affects the conjugate symmetry property exploited in equation 3. A low-cost and simple way to compensate this effect is to calculate the ripple across the decimated band H(ω) from the FFT of the impulse response caused by the decimation, and apply gain and phase compensation to the output of the FFT of 1/H(ω).

The inverse transform 1/H(ω) is stored as a vector of $N_{FFT}$ complex weights which is applied to the output directly after the FFT has been computed.

Although H(ω) is symmetric about zero hertz, it is not symmetric about the primary carrier, so would not be cancelled out when calculating Y(ω)—which is described in more detail below.

Primary Carrier Frequency Estimation 308

The highest magnitude FFT output bin (denoted as bin j) is detected and its power and frequency are measured. This is asserted to be the primary carrier (i.e. strongest sinusoidal tone) and these measurements are passed on to the classification stage discussed in order to detect if any primary signal is present. Identifying the primary carrier frequency leads to identification of non-primary carrier signals (such as an SCT).

Taking the magnitude samples of the three FFT output bins {j−1, j, j+1} a parabolic (quadratic) curve may be fitted to the points, for example using closed-form linear algebra. The fractional bin frequency f in the range of −0.5 to 0.5 of the maximum value of the fitted parabola is taken to be the best estimate of the true primary carrier frequency $\omega_c$. The oversampling of the FFT (e.g. twice oversampling) provides an interpolated mainlobe of the primary carrier and thus facilitates an accurate peak position estimate. Accurate primary carrier peak estimation allows for a more accurate down-conversion, leading to improved subsequent DSB-AM cancellation as the centre point of the reflection is more accurate.

At this stage the width of the primary mainlobe may be assessed by searching out from the peak in both negative and positive frequency until bins that are <3 dB (approximately <0.5 in power) of the peak are identified (i.e. full-width, half maximum (FWHM) of the primary mainlobe). Leading and trailing edges of the primary transmitter in the analysis window cause wide mainlobes, and this measurement may be useful in the later 'feature classification' stage for assessing the time-domain activity of a primary transmitter.

Frequency-Domain Down-conversion 310

Frequency-domain down-conversion 310 is performed by generating a finite-impulse filter which shifts the frequency bins by −(j+f) bins (i.e. by $\omega_c$) so that the underlying maximum of the primary carrier mainlobe is shifted exactly on to the zero frequency bin. This step effectively makes the primary carrier signal symmetric about zero hertz, making later computation and determination of SCT events simpler.

The formula for the filter is given in Equation 5 where $$N_{coeffs}=4, w=[0.3635819, -0.4891775, 0.1365995, -0.0106411]$$

w generates a Blackman-Nuttall window which has good sidelobe performance. Other windows may be used such as 'Kaiser' or 'Equiripple' windows, but cosine-family windows such as Hamming, Hann, Blackman family have the implementation benefit of combining good sidelobe performance with the precise and simple computation using cosines.

The value $X_{LIM}$ sets the limits for the window (i.e. it is zero-valued for $|x|>x_{LIM}$), and hence defines the quality of the resampling (a typical value would be $x_{LIM}=5$). A small value is desirable in order to minimise the processing complexity of down-conversion. The choice of $x_{LIM}$ is discussed in more detail below with reference to FIGS. 7 and 8.

$$g(x) = \begin{cases} \frac{\sin\pi x}{\pi x} \sum_{i=1}^{N_{coeffs}} w_i \cos\left(i\pi\left(1 + \frac{x}{x_{LIM}}\right)\right); & |x| \leq x_{LIM} \\ 0; & |x| > x_{LIM} \end{cases} \quad \text{Equation 5}$$

Figure 7:
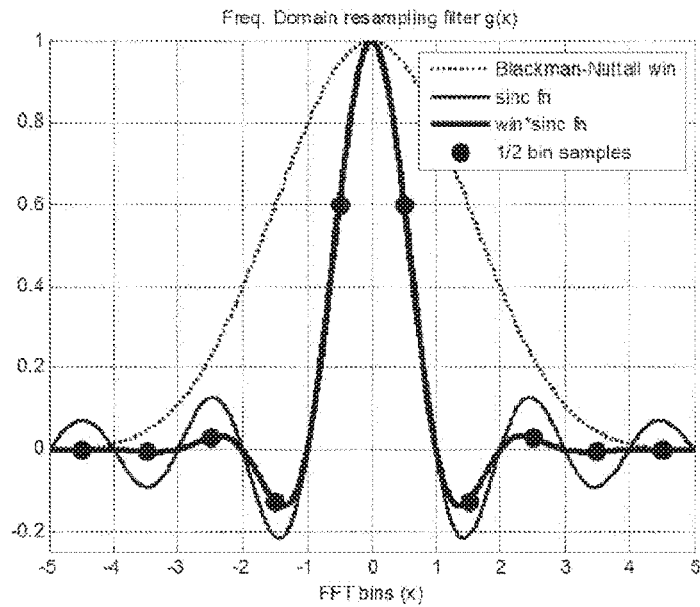
FIG. 7 shows example filters for use in an SCT detection method.

The components of this frequency domain down-conversion filter are shown in FIG. 7. This figure also shows the 'half bin samples' which may be present due to the FFT oversampling described above with reference to FIG. 6. The effect of these fractional bins are described in more detail below with reference to FIG. 8.

$$x_i := \prod_{k=-x_{LIM}}^{+x_{LIM}} g(k-f)x_{(i+j+k) \bmod N_{FFT}} \quad \text{Equation 6}$$

Down-conversion is performed using Equation 6 as a circular convolution on the FFT output x but only including the non-zero terms from Equation 5 to minimise computational cost. For example, with $x_{LIM}=5$, only $2x_{LIM}+1=11$ (−5 to +5) multiply/accumulates are needed per bin. This is analogous to implementing a short Finite Impulse Response (FIR) filter.

Figure 8:
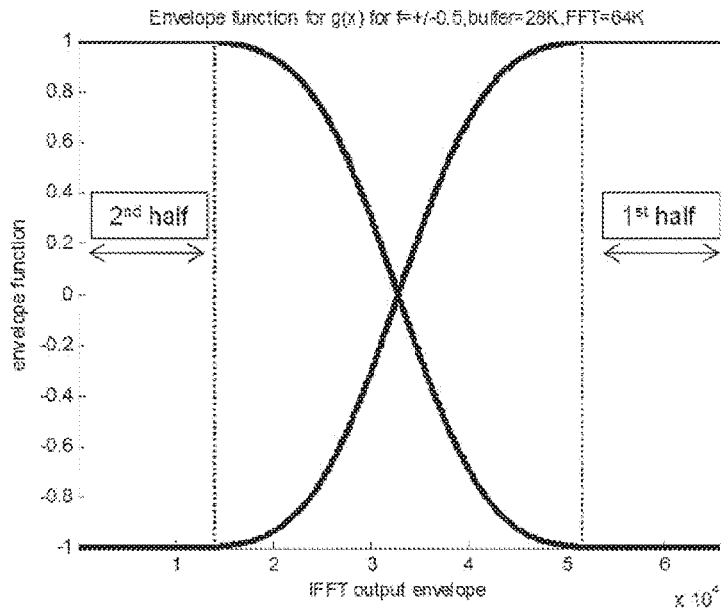
FIG. 8 shows the effect of the filters of FIG. 7 on an example time-domain equivalent (FFT input) envelope.

Frequency domain convolution of two signals is analogous to multiplication of their time-domain equivalents. In this case, the inverse Fourier transform of the g(x) term in Equation 6 is an arbitrary frequency sinusoid with a sampling-dependent envelope function: this is unity when samples are taken on a grid at integer values of x (i.e. f=0) and (worst-case) has ramping and a zero point when samples are taken on a grid at halfway between FFT bins (i.e. f=±0.5) as illustrated in FIG. 8. Other values of f create envelopes intermediate between these extremes. Although this process would not be necessary if only integer values of f were used, doing so would introduce errors into the central frequency and thus mean that the later asymmetry analysis would carry through these errors.

The mathematical explanation for the envelope phenomenon shown in FIG. 8 is as follows. Equation 5 comprises the product of two terms; (1) a sin(x)/x function with infinite support on x (which has too many terms to compute practically) and (2) a compactly supported window function (which makes g(x) economic to compute). In time domain, by analogy, this is the circular convolution of (1) an arbitrary frequency sinusoid and (2) a band-pass filter corresponding to the frequency shifted IFFT of the window function. The output of this filtering process is unit amplitude sinusoid except where a phase discontinuity passes through the filter where the two ends of the sinusoid are circularly "spliced" together. This creates the characteristic "dip" in the sinusoid envelope illustrated in FIG. 8 which is worst-case when a 180 degree continuity passes through (as occurs with the half-bin case).

FIG. 8 also explains the utility of the unconventional zero-padding described above of mapping the "$1^{st}$ half" and "$2^{nd}$ half" of the input buffer to time-domain intervals where the envelope function is almost exactly unity. The mapping of the second half of the time window to the first part of the FFT input and vice versa means that the FFT input maintains its time-order as the end of the first half is effectively contiguous with the start of the second half (as the FFT can be visualised as wrapped around the surface of a cylinder). Hence if the equivalent time-domain product is taken (by taking notional IFFTs of the frequency domain convolution), we have the desired effect of the signal multiplied by a unit-amplitude complex sinusoid in order effect high-quality, precise down-conversion of the primary signal. Slight deviation from unity over the non-zero-padded part of the envelope function is permitted as a perfect standard rectangular window is not necessary. A tolerance of deviation from the maximum of the envelope function of approximately 1% is preferable.

The choice of $x_{LIM}$ is a function of the oversampling ratio $$\left(\frac{n_{FFT}}{f_s \times T}\right)$$

so as to be the smallest value to minimise the computational complexity of the window filter whilst not impinging on the 'flatness' of the envelope function. If $x_{LIM}$ is too small, the envelope function would begin to curve over the sections of the IFFT which contain the signal data, resulting in the signal being modified prior to DSB-AM cancellation. The value of $x_{LIM}$ which satisfies this trade-off has been empirically found to be approximately (12/oversampling ratio).

The final stage in down-conversion is to rotate the FFT output such that the primary carrier is zero-phase (phase-rotation). This is performed by Equation 7 where x is the down-converted FFT output derived from Equation 6.

$$x := x\frac{x_0^*}{|x_0|} \quad \text{Equation 7}$$

DSB-AM Cancellation (of Primary Signal) 312

DSB-AM cancellation 312 as discussed above is effected by applying Equation 8 in order to generate an output vector y comprising $N_{FFT}/2+1$ bins (the zero frequency bin and the right hand side of the spectrum). As $Y(\omega)$ is by mathematical definition conjugate symmetric about zero for an ideal primary carrier, only computation of the right hand side (i.e. positive frequency) is necessary. Only magnitude information is taken into y for the purpose of peak detection, hence the modulus is taken.

$$y_i = |x_i - (x_{(N_{FFT}-i) \bmod N_{FFT}})^*|; i \in \left(0, 1, \ldots \frac{N_{FFT}}{2}\right) \quad \text{Equation 8}$$

The quality of DSB-AM cancellation 312 is dependent on the temporal coherence of the primary signal. Phase noise on the primary carrier can lead to some feed through of tonal components in the sidebands which may appear as distinct tones in $Y(\omega)$. A simple technique for identifying such tones using the concept of power 'asymmetry' is described below.

Subtracting the conjugate of the negative frequencies from the positive frequencies of the sum signal (after down-conversion) effectively cancels out the part of the signal in-phase with the primary carrier (attenuating the frequency domain primary carrier within the sum-signal), leaving just signals which have introduced phase noise into the sum-signal. These signals include phase noise (which would generally be at a low-level across a wide range of frequencies) and specific tones, which would manifest as peaks in the frequency plot.

Noise Floor Estimation 314

SCT tones in y are characterised by isolated narrowband peaks against a noise floor after DSB-AM cancellation of the primary carrier transmission. Hence, in order to detect peaks, a noise floor estimate which is not biased by tonal peaks should be estimated. Noise levels may not be constant over the whole frequency range in question, so the noise level at every frequency bin is estimated in order to 1) capture secondary transmissions above the local noise level, but potentially below the noise level elsewhere, and 2) discount frequency bins with higher levels of noise than elsewhere. A single estimate of the noise level across the entire frequency spectrum would not be able to account for such circumstances, resulting in, in the case of 1) false negatives, and in the case of 2) false positives. Either of these scenarios is undesirable, false negatives particularly so in an ATC implementation as such events could result in a dangerous situation.

An effective way to determine a frequency-dependent noise floor estimation is to calculate a moving-average of the magnitude across a range of bins centred around a particular frequency bin. If a large enough bin range is used and peaks are not frequent, this would be an accurate representation of the noise floor at that frequency bin. In one example a short sliding-window rank-order statistic filter is applied which extracts the e.g. the median, power bin as the noise floor estimate. Analogous filters are used for removing impulsive noise from otherwise smooth functions in applications like image processing.

This concept is expressed simply in Equation 9 where the median window estimate is over $\pm N_{NFE}$ bins (a typical value is $N_{NFE}=256$ when $N_{FFT}=65536$). If the window is too long, frequency-dependent changes in the noise floor are smoothed-out and the noise floor does not respond to local effects such as colouration from filters. On the other hand if $N_{NFE}$ is too short, legitimate SCT peaks may adversely bias the noise floor estimate leading to them being smoothed and subsequently discounted. A value for $N_{NFE}$ of approximately $\sqrt{N_{FFT}}$ has been found to satisfy this trade-off, but other information (such as known noise sources) may be taken into account in the choice of $N_{NFE}$.

An issue occurs when applying the window to the very start and end of y where non-existent bins are addressed outside the boundary. A solution is to reflect-in the missing bins from the respective boundary such that e.g. bin $i=-1$ comes from bin $i=+1$, and similarly so, for the end of y.

$$n_i = \text{median}(y_{i-N_{NFE}\ldots i+N_{NFE}}); i \in \left(0, 1, \ldots \frac{N_{FFT}}{2}\right) FFT \quad \text{Equation 9}$$

Median filtering is costly to compute in terms of procession time and power. A practical optimisation is to decimate y by summing contiguous blocks of $D_1$ samples and then using a much shorter median filter over $\pm D_2$ on the resulting decimated signal. The aggregate window size is $N_{NFE}=D_1 D_2$. For instance, $D_1=16$ and $D_2=16$ when $N_{NFE}=256$. This has little performance loss when the time series y is dominated by the noise floor and has sparsely located peaks. In one embodiment $D_1=D_2=\sqrt{N_{NFE}}$, this splits the processing load evenly between the linear moving average process and the non-linear median filtering process. In other embodiments fewer, larger windows may be taken or alternatively, more, smaller windows. The choice of length of windows $D_1$, $D_2$ is also dependent on the trade-off between too short being dominated by peaks and too long missing the trend of the noise, for example $D_1$ and $D_2$ could each vary between 4 and 64 as a general illustration in these circumstances.

The median is the default rank-order statistic to draw out, but other measures of central tendency are possible, for example the $40^{th}$ centile, which will be less biased by peaks, but more susceptible to low power noise samples.

Peak Detection of Secondary Carriers 316

Peaks are identified in y by identifying local maxima, where $y_i > y_{i-1}$ and $y_i > y_{i+1}$. Performing just this analysis may pick up a lot of spurious fluctuations in the noise floor, for this reason only peaks (i.e. values of $y_i$) that satisfy a certain predefined threshold (peak_metric_thresh) are identified as SCT candidates. Example values for peak_metric_thresh are provided below with reference to FIGS. 11(a), 11(b), 12, 13(a), 13(b), 13(c) and 14, but may vary from around 0.85 to 3 (or greater than 3) depending on the situation.

In one embodiment this is where the distinct peaks in y are $10^{peak\_metric\_thresh}$ times higher than the (local) noise floor n. This is denoted the subset P of the set of all possible i values (bin indices) which satisfies Equation 10.

$$(y_i > 10^{peak\_metric\_thresh} n_i) \text{ AND } (y_i > y_{i-1}) \text{ AND } \quad \text{Equation 10}$$
$$(y_i > y_{i+1}); \left(1, 2 \ldots \frac{N_{FFT}}{2} - 1\right)$$

This gives rise to the value of peak metric (principally for diagnostic purposes) in Equation 11.

$$p(i) = \log_{10} \frac{y_i}{n_i}; i \in P \quad \text{Equation 11}$$

The threshold peak_metric_thresh is preferably a system-set parameter which may be calculated once upon calibration of the system; alternatively it may be dynamically calculated so as to result in a system with a specific false-positive rate. This may be useful if the variance in the noise floor (i.e. the accuracy of the noise floor estimate) changes over time so that the system becomes more prone to false negatives (if the variance decreases) or it becomes more prone to false-positives (the variance increases). In an average situation, a value for the peak metric threshold p(i) would be between 1 and 4, more preferably between 2 and 3 as a general illustration in these circumstances.

Another metric that may be used to reduce the number of candidate peaks is to specify that two peaks must be separated by a minimum frequency otherwise they are treated as a single peak (i.e. the smaller peak is disregarded). The threshold min_freq_sep is defined. In one example this is between 5 Hz and 50 Hz, preferably between 7 Hz and 15 Hz, and preferably approximately 10 Hz. Disregarding the smaller peak of a closely separated pair of peaks has negligible impact on the capability to detect genuine secondary tones when peak detections are sparsely separated. Such a feature allows strong peaks from e.g. 400 Hz mains hum (which are highly conjugate-symmetric) to absorb their own sidelobe features which are much weaker in power but more asymmetric and thus can cause false positives. The method identifies the weaker peaks from the set P which are within +/−min_freq_sep of the current secondary tone candidate being analysed, and marks them for deletion from set P by placing them in the set Q as follows (with commentary accompanying each step):

Q={ } create an empty set Q
for all i; i∂P i is a counter for all candidate peaks in the set P
for all j; j∂P j is a counter for all candidate peaks in the set P
if ($|x_j|<|x_i|$) AND $$\left(\frac{|i-j|f_s}{N_{FFT}} < \min\_freq\_sep\right)$$

every peak j is compared with every other peak i in the set P for if j has a lower magnitude than i and is within the minimum frequency separation from i (i and j are frequency bin numbers so are first converted to a real frequency difference by multiplying by the sampling $f_s$ and dividing by the total number of bins $N_{FFT}$). It should be noted that when j==i the condition is not met due to the strict magnitude inequality.

Q:=Q ∪j the peaks j that satisfy the above are added to the set Q
end (if)
end (for)
end (for)

Power Asymmetry Analysis 318

Given secondary tone candidate indices in P, a non-negative real-valued asymmetry metric is computed using Equation 12. This is a measure of how asymmetric the power is between positive and negative frequencies (with respect to the down-converted primary carrier at zero frequency).

$$a(i) = \left|\log_{10}\frac{|x_i|}{|N_{FFT}-i|}\right|; i \in P \quad \text{Equation 12}$$

An asymmetry analysis favours 'legitimate' SCT events over other phase noise as SCT events have (by definition) a central frequency offset from that of the primary carrier and are thus asymmetric about primary carrier (and, after down-conversion, are asymmetric about zero hertz). There is a low probability of another tone precisely at the opposite frequency sign as this would correspond to a third SCT at a very specific frequency.

In contrast, "worst-case" primary signals with the deleterious properties of (1) high phase noise and (2) voice sidebands contaminated with interference tones (from e.g. mains electricity) generate secondary carrier candidates which are very symmetric in power (from the core definition of DSB-AM conjugate symmetry).

Hence the asymmetry metric a(i) provides a useful way to exploit values that are pre-computed elsewhere in the process (i.e. bins from the down-converted X(ω) in vector x) to reject false positives from poor quality primary transmitters.

Figure 12:
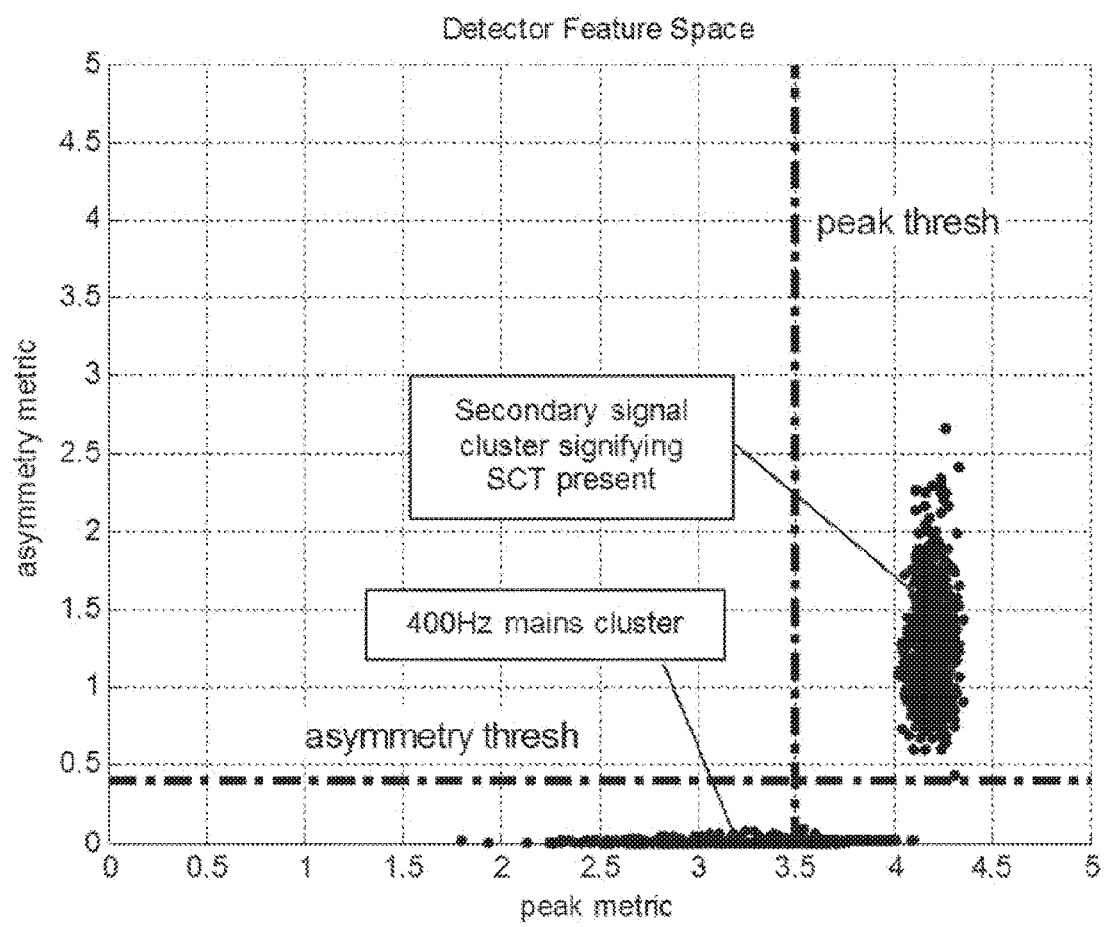
FIG. 12 shows a 'feature space' plot of the peak and asymmetry metrics of a large number of simulations.

A threshold, asym_metric_thresh, for the value of a(i) is defined where peaks not meeting this threshold are discarded as being too symmetrical, and thus unlikely to be SCTs. The asymmetry threshold provides a means to discount peaks which have a high residual power following subtraction due to the fact that the symmetric peaks had a high power prior to subtraction—for example if the signal has a high level of noise (which is not perfectly symmetrical), or due to external effects such as mains hum. FIGS. 12, 13(b) and 13(c) below show scenarios where the asymmetry threshold is utilised to reduce the false-positive rate by limiting the number of events above the power threshold which would otherwise be deemed to be SCT events.

Feature Space Classification 320

Before a candidate peak from set P can be determined as an SCT event, a number of checks may be performed.

In order for an SCT to be present, there must be first the presence of a primary peak. This eliminates false positives when there is no transmission being received. A threshold primary_pk_thresh is defined where SCT analysis is only undertaken if the primary peak is above this threshold. This threshold is corrected by the amount of gain applied to the signal (AGC_gain) so as to measure the absolute power of the primary signal.

A threshold is also set for the maximum allowed width of the primary peak, primary_bw_thresh, where SCT analysis is only undertaken if the width of the primary carrier peak is greater than this threshold. This ensures that a certain lower bound is met on the mark-space ratio of the primary transmitter in the analysis window, for example it may be desirable for the primary transmission to occupy at least 50% of the time window. This can prevent some anomalies due to rising edges entering or trailing edges leaving the analysis window. The width of the primary carrier peak is an output which is simple to generate and which provides some clear information about the temporal activity of the primary transmitter.

The following section describes logic which may implement the classification part of the method.

Inputs from Primary Carrier Frequency Estimation

The following additional inputs are used for detecting the presence of a primary signal (and have associated thresholds):

primary_pk
Magnitude value of primary peak
primary_bw
Primary peak 3 dB width in bins (FWHM)
AGC_gain The Automatic Gain Control magnitude gain applied elsewhere in the receiver.

Impact of AGC in the RX chain

Automatic Gain Control (AGC) will modulate the dynamic range of signals; therefore the primary_pk value is scaled by the amount of applied AGC and thus needs to be re-scaled by the reciprocal of the AGC gain in order to have an absolute power in terms of dBm.

Example Decision Logic

The following decision logic is given as an example of how to generate a Boolean detection output.

if (primary_pk>(primary_pk_thresh/AGC_gain)) AND
(primary_pk>primary_bw_thresh) AND
there exists any a(i)>asym_metric_thresh; i∈P
then
SCT_detect=TRUE
else
SCT_detect=FALSE
end (if)

This analysis would give a Boolean 'yes' or 'no' to any peak that has passed the previous filtering stages so that it remains in candidate set P (e.g. that it is above the peak threshold and is not close in frequency to another peak).

The exact values of the parameters used in the analysis (e.g. a(i) and p(i)) can be used in a 'quadrant' analysis, wherein the combination of them in a feature space leads to a positive SCT determination.

A more generalised analysis is to fit a suitable likelihood density function of the form prob(peak_metric, asymmetry_metric) given SCT present ("H1") or SCT absent ("H0") and then computing a likelihood ratio to make the decision. The exact form of the likelihood function would depend on the application, as well as other factors such as desired false positive rate.

A more sophisticated algorithm than the decision logic described above, with some statistical modelling of the parameter density functions under different H1/H0 hypotheses (e.g. Gaussian Mixtures Model, Fuzzy Clustering, Neural Network, or Support Vector Machines) would be capable of generating a 'soft' output with a confidence score, for example between zero and one.

Such a confidence level could be fed-back to the end user for information and/or calibration purposes.

Simulation Results

To illustrate the operation of the proposed method the following 'difficult' signal scenario comprising the presence of SCT is demonstrated, the scenario featuring:

Primary DSB-AM signal carrying voice audio and additive loud 400 Hz mains hum
Primary carrier frequency error
Significant phase noise on the primary carrier
Secondary DSB-AM signal carrying voice
Additive White Gaussian Noise (AWGN)

FIGS. 9(a) and 9(b) shows the spectrum $X(\omega)$ of the input (a) and output (b) signals of Frequency Domain Down-Conversion. The primary carrier, voice sidebands, 400 Hz mains tone sidebands and the secondary signal (creating an SCT-present scenario) are marked. After down-conversion, the primary carrier is shifted to zero-frequency making the two voice and 400 Hz mains sidebands and the carrier of the single secondary signal respectively symmetric and asymmetric about zero-frequency, as discussed above.

FIGS. 10(a) and 10(b) illustrates the results of the DSB-AM cancellation spectrum $Y(\omega)$ (a) and the noise floor estimated spectrum $N(\omega)$ (b) in comparison to the superposed positive and negative frequency halves of $X(\omega)$. DSB-AM cancellation has achieved around 25 dB attenuation of the 400 Hz tone with negligible attenuation of the secondary carrier. This is because the 400 Hz mains hum modulates the primary carrier and is thus conjugate-symmetric with respect to the primary carrier. This means this feature is largely attenuated by the proposed frequency domain DSB-AM cancellation stage. However the secondary carrier is not conjugate symmetric with respect to the primary carrier and is not significantly attenuated.

The noise floor estimate, $N(\omega)$—shown in FIG. 10(b), follows the underlying spectral envelope of $Y(\omega)$ without much bias from isolated peaks in $Y(\omega)$. Note that imperfect DSB-AM cancellation of the (semi-coherent, poor quality) primary signal has led to some feed-through of primary voice spectrum which is followed by the noise floor estimate $N(\omega)$.

FIGS. 11(a) and (b) illustrates detected peaks (the peak_metric_thresh is set low to a value of 0.85 to allow false detections through for characterisation). Two peaks are correctly detected for respectively the 400 Hz mains tone and secondary carrier. Though the peak metrics are of comparable magnitude (shown in FIG. 11(a)), the asymmetry metrics are different (FIG. 11(b)).

By extension, if a Monte Carlo run of 1000 simulations is performed with the same parameters, but randomised noise and frequency offsets, we obtain the informative scatterplot in FIG. 12 of peak metric versus asymmetry metric. There are two distinct clusters caused by (1) highly power-symmetric detections due to poorly-cancelled 400 Hz tones and (2) highly asymmetric tones due to genuine secondary carrier. Feature space design as described above may be used to distinguish between these two different sets of candidate peaks even with 'difficult' signal parameters.

Figure 14:
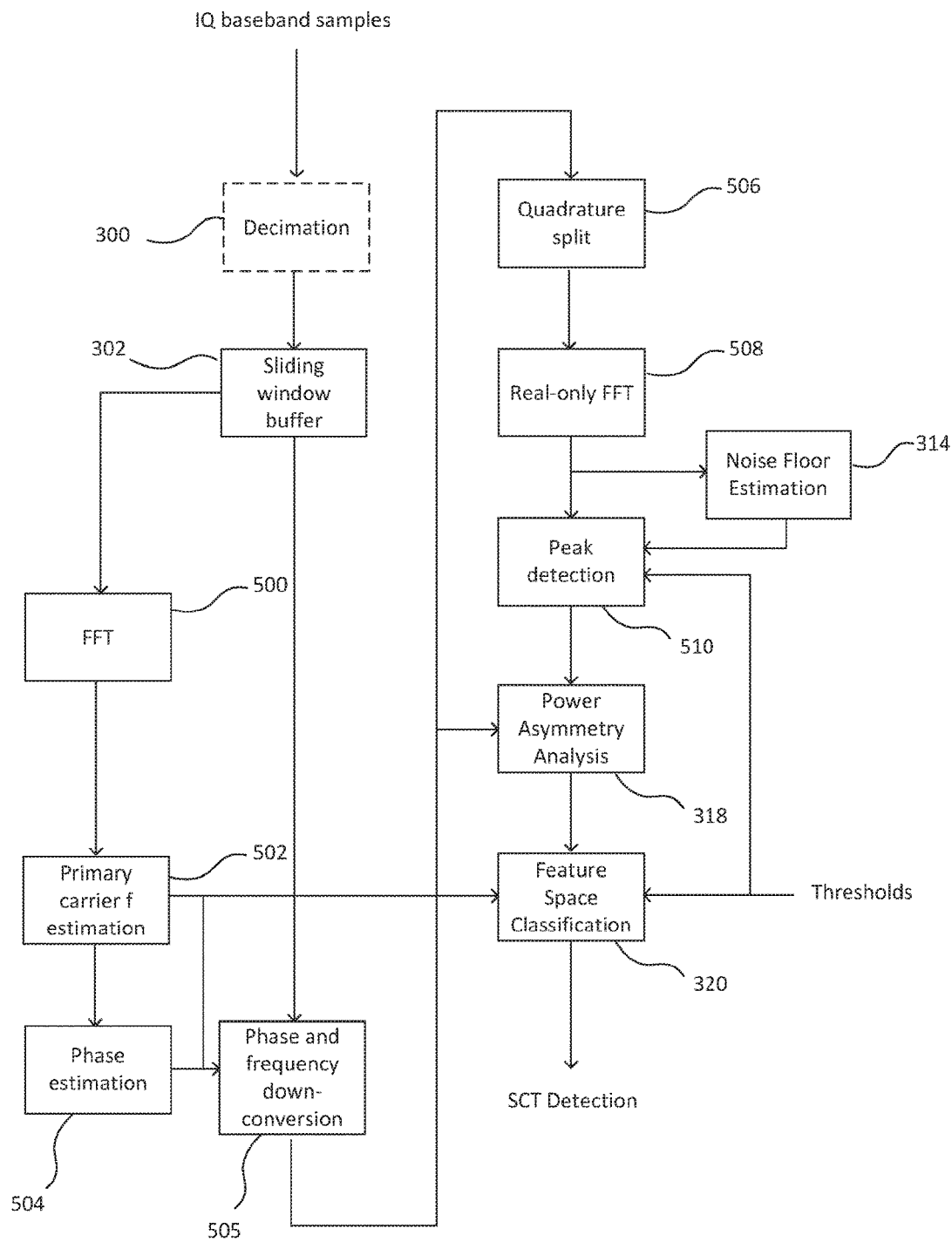
FIG. 14 shows a flow diagram of an alternative method for SCT detection.

Various thresholds may be used to determine legitimate SCT events. FIG. 14 illustrates the utility of such thresholds. For illustration, empirically setting the asym_metric_thresh≈0.4 and the peak_metric_thresh≈3.5 excludes most of the 400 Hz false positives and still includes the majority of the genuine secondary signal cluster true positives as shown by FIG. 12.

Figure 13A:
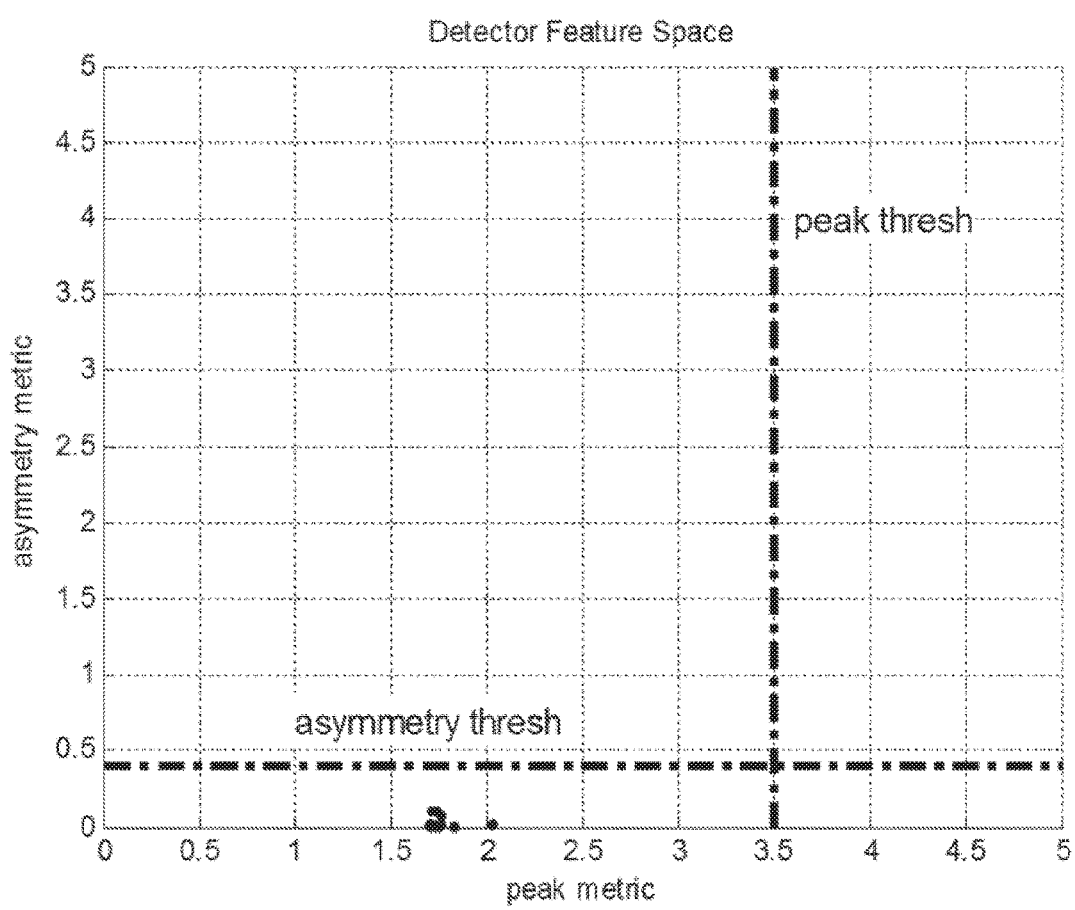
FIG. 13(a) shows a scenario where an SCT and 400 Hz mains noise are absent.
Figure 13B:
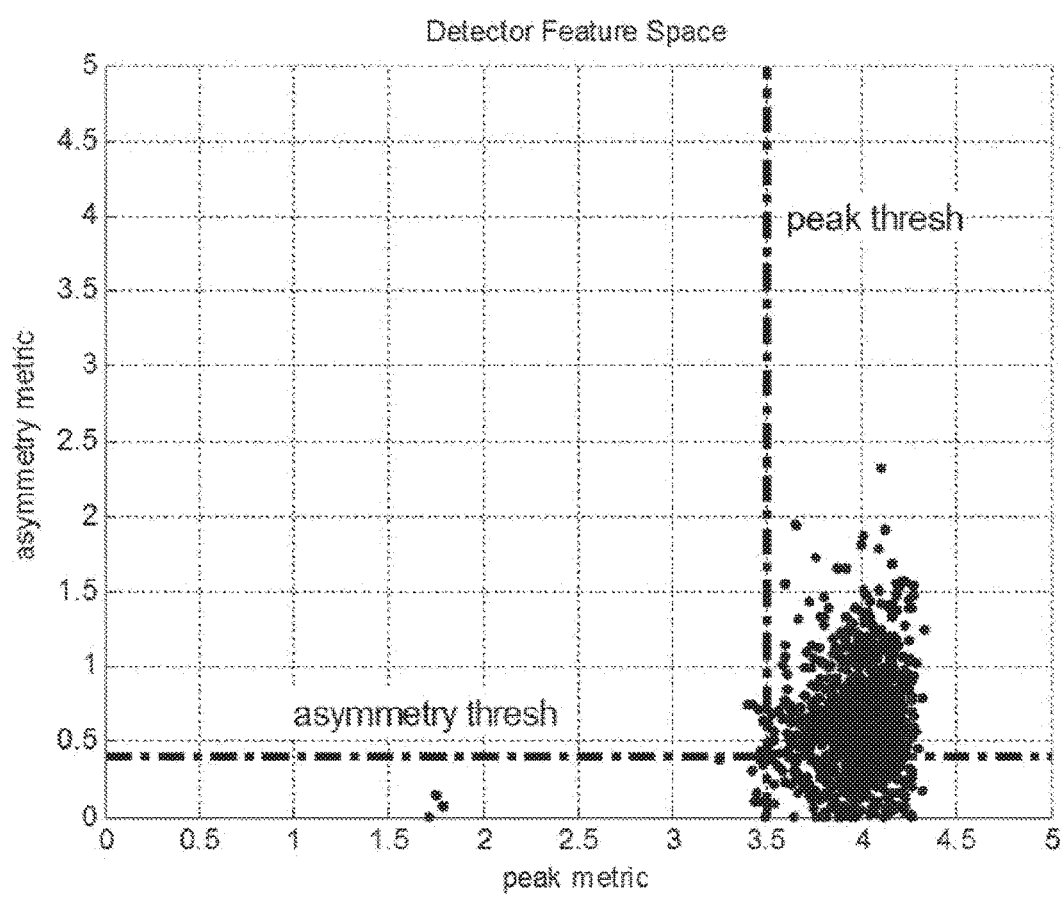
FIG. 13(b) shows a scenario where an SCT is present and 400 Hz mains noise is absent.
Figure 13C:
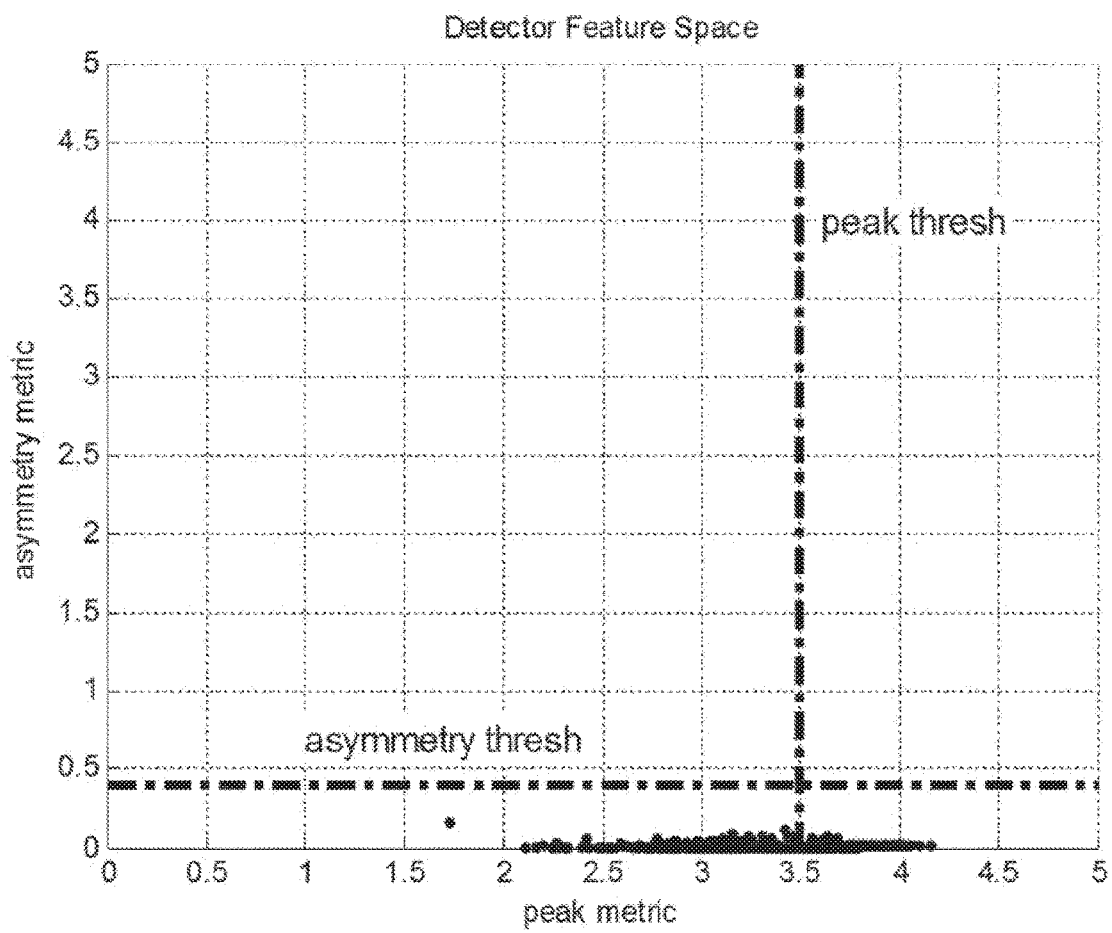
FIG. 13(c) shows a scenario where an SCT and 400 Hz mains noise are present.

Three further scenarios are illustrated in FIGS. 13(a), 13(b) and 13(c), as described in the table below:

| Primary 400 Hz Mains | SCT absent | SCT present |
|---|---|---|
| Absent | FIG. 13(a) There are a few isolated points, well below the proposed thresholds. No false positives. | FIG. 13(b) Most of the SCT true positives lie in the top right quadrant described by the two proposed thresholds. |
| Present | FIG. 13(c) There is a cluster of points, exceeding the peak threshold, but not the asymmetry threshold. This shows the value of the proposed dual threshold idea. No false positives would be generated. | FIG. 12 As discussed above. |

Such 'feature space classifications' may be provided to a user for system analysis, or the SCT determination may be performed directly on the data with no graphical output.

'Mixed Domain' SCT Detection

An alternative embodiment where both the time series and the spectrum of the received signal are processed is described below. This embodiment may be preferable if processing power is limited, as processing large amounts of FFTs and their outputs can be processor intensive, especially if the FFT is significantly oversampled.

FIG. 14 shows a high-level flow diagram for the 'mixed domain' method; many of the steps having corresponding steps in the frequency domain SCT detection method. The detail relating to the corresponding steps described above applies to this alternative embodiment unless explicitly indicated otherwise.

The first steps are as described previously, wherein the incoming signal is decimated 300 and 'chopped up' into overlapping windows 302.

The method then branches, with one branch performing an FFT 500, estimating the frequency 502 and phase 504 of the primary transmission in the signal. The phase may be estimated by determining the phase of the samples used in determining the peak (e.g. the highest magnitude sample and the two either side). The highest magnitude samples would most likely be from the primary carrier so are most likely to have the primary phase. The primary carrier frequency and phase are used to down-convert 505 the time-domain windows by mixing each window with a complex sinusoid with the same frequency and phase-offset as the primary carrier transmission.

Figure 15:
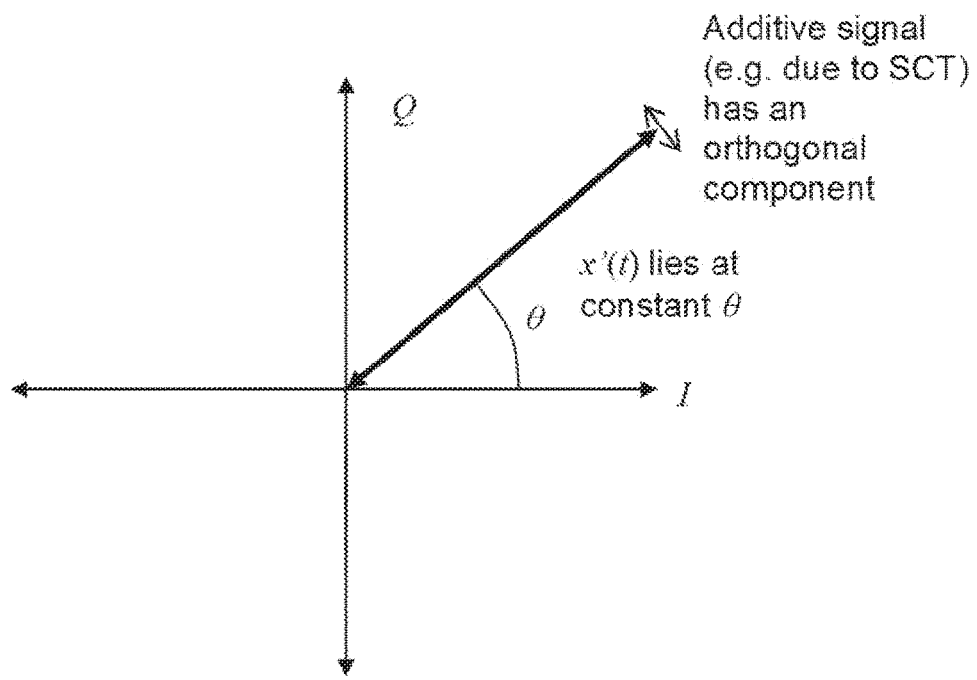
FIG. 15 is an illustration of the in-phase and quadrature components of a signal where an SCT is present.

The signal can be illustrated by FIG. 15 where the in-phase (I) and quadrature (Q) components of a frequency down-converted signal (x'(t)) are plotted. If there were only perfect, phase noise free, primary carrier transmission, this vector would lie at constant θ with its magnitude (i.e. length) changing with time. If there are any additive signals (such as SCTs or phase noise), the vector's angle would also change.

In order to measure this part of the signal, the signal is phase-rotated by θ and the part of the vector moving along the Q axis is measured. This step corresponds to the 'Quadrature split' 506 step in FIG. 14. This process is mathematically linear and so information is preserved and no artificial intermodulation effects are propagated through to the following processing steps.

A real-only input FFT 508 is performed on the Q component of the phase-rotated signal. This provides a spectrum from which peaks are detected 510 corresponding to the out-of-phase components of the original signal.

The analysis of these peaks so as to determine the presence of an SCT event then follows in the same way as described above.

Alternatives and Modifications

The above specification refers primarily to the situation where two simultaneous transmissions are present, but the same system would be able to alert the user to any number of simultaneous transmissions. The specification has been limited to the former scenario as this is statistically far more likely.

Furthermore, the specification above is primarily concerned with simultaneous voice transmissions received by an Air Traffic Controller, but it will be appreciated that the signal does not necessarily have to be voice transmissions. For example, it may be digital information encoded into an AM radio transmission.

In the above description, the conjugate of the negative frequency sideband is subtracted from the related positive frequency sideband of the sum-signal so as to cancel out the primary carrier. The opposite operation is equally possible whereby the conjugate of the positive frequency sideband is subtracted from the related negative frequency sideband of the sum-signal.

Various ranges and/or values are provided in this description, often with reference to specific embodiments, notably being derived from values such as buffer window size T, sampling rate $f_s$ and audio/signal bandwidth. Those skilled in the art would understand that for different applications or operating conditions, the system and method may operate more effectively with these values modified.

It will be understood that the present invention has been described above purely by way of example, and modifications of detail can be made within the scope of the invention.

Reference numerals appearing in the claims are by way of illustration only and shall have no limiting effect on the scope of the claims.

The invention claimed is:

1. A method of determining a presence of a secondary carrier signal in a time-domain sum-signal including a primary carrier signal, the method comprising:
   transforming the time-domain sum-signal into a frequency domain sum-signal;
   determining a conjugate of a sideband of a frequency-domain primary carrier signal;
   attenuating the primary carrier signal by using said conjugate of the sideband of the frequency-domain primary signal;
   extracting at least one peak from the thus attenuated frequency-domain sum-signal; and
   determining the presence of the secondary carrier signal in the frequency-domain sum-signal based on said at least one peak.

2. The method according to claim 1 further comprising identifying the primary carrier signal within the frequency-domain sum-signal.

3. The method according to claim 2 wherein identifying the primary carrier signal comprises estimating a primary carrier frequency.

4. The method according to claim 3 wherein estimating the primary carrier frequency comprises determining at least one of: a highest magnitude frequency output bin; and the frequency of a magnitude peak of the frequency-domain sum-signal.

5. The method according to claim 4 wherein three highest magnitude frequency output bins are determined and a quadratic curve is fitted so as to interpolate the peak frequency.

6. The method according to claim 3 further comprising down-converting the frequency-domain sum-signal based on said estimated frequency.

7. The method according to claim 6 further comprising phase-rotating the frequency-domain down-converted sum-signal.

8. The method according to claim 6 wherein the down-conversion is performed by convolving the transform output with a window filter.

9. The method according to claim 8 wherein the window filter comprises a closed-form cosine function.

10. The method according to claim 9 wherein the window filter comprises at least one of a Blackman family window, a Blackman-Nuttall window.

11. The method according to claim 8 wherein the window filter comprises one of Kaiser or Equiripple.

12. The method according to claim 1 wherein the conjugate of the sideband of the primary signal is subtracted from the opposing frequency sideband of the frequency-domain sum-signal.

13. The method according to claim 1 wherein the step of transformation into the frequency domain is performed using a Fourier Transform (FT).

14. The method according to claim 1 wherein the step of transformation into the frequency domain is performed using a discrete transform comprising input and output bins.

15. The method according to claim 14 wherein the frequency-domain sum-signal is split and mapped onto the input of said transform with a larger size than the frequency-domain sum-signal, wherein in a central part of said transform comprises zero-valued input bins.

16. The method according to claim 15 wherein a second half of said frequency-domain sum-signal is mapped onto a first part of the transform input and a first half of the frequency-domain sum-signal is mapped onto a final part of the transform input.

17. The method according to claim 1 wherein determining the presence of a secondary carrier signal comprises performing a symmetry analysis on said peak.

18. An apparatus for determining a presence of a secondary carrier signal in a time-domain sum-signal including a primary carrier signal, the apparatus comprising:
 a transform arranged to transform the time-domain sum-signal into a frequency domain sum-signal;
 a comparator arranged to:
  determine a conjugate of a sideband of a frequency-domain primary carrier signal,
  attenuate the primary carrier signal by using said conjugate of the sideband of the frequency-domain primary signal, and
  extract at least one peak from the thus attenuated transformed frequency-domain sum-signal; and
 logic circuitry arranged to determine the presence of the secondary carrier signal in the frequency-domain sum-signal based on said at least one peak.

19. The apparatus according to claim 18 comprising a radio.

* * * * *